(12) United States Patent
Saishu et al.

(10) Patent No.: US 8,072,484 B2
(45) Date of Patent: Dec. 6, 2011

(54) STRUCTURE OF THREE-DIMENSIONAL IMAGE DATA, METHOD OF RECORDING THREE-DIMENSIONAL IMAGE DATA, AND METHOD OF DISPLAYING AND REPRODUCING THREE-DIMENSIONAL IMAGE DATA

(75) Inventors: Tatsuo Saishu, Tokyo (JP); Shingo Yanagawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1364 days.

(21) Appl. No.: 11/652,470

(22) Filed: Jan. 12, 2007

(65) Prior Publication Data
US 2007/0109620 A1   May 17, 2007

Related U.S. Application Data

(63) Continuation of application No. PCT/JP2005/017978, filed on Sep. 29, 2005.

(30) Foreign Application Priority Data

Sep. 29, 2004   (JP) ................................. 2004-285246

(51) Int. Cl.
*H04N 13/02* (2006.01)
(52) U.S. Cl. .......................................... 348/46; 348/51
(58) Field of Classification Search .................... 348/46, 348/51
See application file for complete search history.

(56) References Cited

U.S. PATENT DOCUMENTS

| | | | |
|---|---|---|---|
| 6,795,241 B1 * | 9/2004 | Holzbach ...................... | 359/463 |
| 7,064,895 B2 * | 6/2006 | Morishima et al. ........... | 359/463 |
| 7,525,541 B2 * | 4/2009 | Chun et al. .................... | 345/419 |
| 2003/0048354 A1 | 3/2003 | Takemoto et al. | |
| 2004/0252374 A1 | 12/2004 | Saishu et al. | |
| 2005/0073577 A1 * | 4/2005 | Sudo et al. ..................... | 348/51 |
| 2005/0083246 A1 | 4/2005 | Saishu et al. | |

(Continued)

FOREIGN PATENT DOCUMENTS

EP   1 501 318 A1   1/2005

(Continued)

OTHER PUBLICATIONS

Saishu, et al., "Structure of stereoscopic image data, sterescopic image data recording method, reproducing method, recording program, and reproducing program", U.S. Appl. No. 10/581,364, filed Jun. 2, 2006.

(Continued)

*Primary Examiner* — Michael Won
(74) *Attorney, Agent, or Firm* — Finnegan, Henderson, Farabow, Garrett & Dunner, L.L.P.

(57) ABSTRACT

An apparatus displaying a three-dimensional image is provided with a parallax barrier having optical openings arranged at a horizontal pitch n times as large as that of pixels arranged on a display surface. The parallax barrier reproduces rays from every n pixels on the display surface in a horizontal direction and no vertical parallaxes is displayed in a viewing area. Image data for a three-dimensional image is processed so as to be recorded in an efficient saving format which minimizes the degradation of image quality while accomplishing a high compression rate. Image data from a set of pixels constituting parallel rays in the same parallax direction are accumulated to obtain more than n parallax component images. Parallax component images corresponding to n-th adjacent parallax directions are combined together and thus converted into n connected images having the same numbers of vertical and horizontal pixels.

20 Claims, 37 Drawing Sheets

U.S. PATENT DOCUMENTS

| | | |
|---|---|---|
| 2005/0105179 A1 | 5/2005 | Taira et al. |
| 2005/0264651 A1 | 12/2005 | Saishu et al. |
| 2006/0087556 A1* | 4/2006 | Era .................................. 348/51 |
| 2007/0109620 A1* | 5/2007 | Saishu et al. ..................... 359/23 |
| 2010/0321388 A1* | 12/2010 | Daly et al. ..................... 345/427 |

FOREIGN PATENT DOCUMENTS

| | | |
|---|---|---|
| JP | 10-262268 | 9/1998 |
| JP | 2003-90738 | 3/2003 |
| JP | 2003-169351 | 6/2003 |
| JP | 2003-315356 | 11/2003 |
| JP | 2004-240469 | 8/2004 |
| WO | WO 03/092305 A1 | 11/2003 |
| WO | WO 2004/057879 A1 | 7/2004 |

OTHER PUBLICATIONS

Feldman, et al., "The Parallax Player: A Stereoscopic Format Converter", SPIE vol. 5006, pp. 175-186, (2003).

Saishu, et al., "53.3: Distortion Control in a One-Dimensional Integral Imaging Autostereoscopic Display System with Parallel Optical Beam Groups", SID 04 Digest, pp. 1438-1441, (2004).

International Search Report issued on Nov. 15, 2005 in PCT/JP2005/017978.

International Preliminary Report on Patentability issued on Apr. 12, 2007 in PCT/JP2005/017978.

* cited by examiner

| Parallax number | 3D pixel number | | | LCD subpixel number | |
|---|---|---|---|---|---|
| | Start (left end) | End (right end) | Area width | Start (left end) | End (right end) |
| −15 | 2 | 8 | 7 | 13 | 121 |
| −14 | 2 | 36 | 35 | 14 | 626 |
| −13 | 2 | 63 | 62 | 15 | 1113 |
| −12 | 2 | 91 | 90 | 16 | 1618 |
| −11 | 2 | 119 | 118 | 17 | 2123 |
| −10 | 2 | 147 | 146 | 18 | 2628 |
| −9 | 1 | 174 | 174 | 1 | 3115 |
| −8 | 1 | 202 | 202 | 2 | 3620 |
| −7 | 1 | 230 | 230 | 3 | 4125 |
| −6 | 1 | 258 | 258 | 4 | 4630 |
| −5 | 1 | 285 | 285 | 5 | 5117 |
| −4 | 1 | 313 | 313 | 6 | 5622 |
| −3 | 1 | 320 | 320 | 7 | 5749 |
| −2 | 1 | 320 | 320 | 8 | 5750 |
| −1 | 1 | 320 | 320 | 9 | 5751 |
| 1 | 1 | 320 | 320 | 10 | 5752 |
| 2 | 1 | 320 | 320 | 11 | 5753 |
| 3 | 1 | 320 | 320 | 12 | 5754 |
| 4 | 8 | 320 | 313 | 139 | 5755 |
| 5 | 36 | 320 | 285 | 644 | 5756 |
| 6 | 63 | 320 | 258 | 1131 | 5757 |
| 7 | 91 | 320 | 230 | 1636 | 5758 |
| 8 | 119 | 320 | 202 | 2141 | 5759 |
| 9 | 147 | 320 | 174 | 2646 | 5760 |
| 10 | 174 | 319 | 146 | 3133 | 5743 |
| 11 | 202 | 319 | 118 | 3638 | 5744 |
| 12 | 230 | 319 | 90 | 4143 | 5745 |
| 13 | 258 | 319 | 62 | 4648 | 5746 |
| 14 | 285 | 319 | 35 | 5135 | 5747 |
| 15 | 313 | 319 | 7 | 5640 | 5748 |
| | | | 5760 | | |

| Parallax number | 3D pixel number Start (left end) | End (right end) | Area width | LCD subpixel number Start (left end) | End (right end) |
|---|---|---|---|---|---|
| −20 | 2 | 15 | 14 | 8 | 242 |
| −19 | 2 | 29 | 28 | 9 | 495 |
| −18 | 2 | 42 | 41 | 10 | 730 |
| −17 | 2 | 56 | 55 | 11 | 983 |
| −16 | 2 | 70 | 69 | 12 | 1236 |
| −15 | 2 | 84 | 83 | 13 | 1489 |
| −14 | 2 | 98 | 97 | 14 | 1742 |
| −13 | 2 | 112 | 111 | 15 | 1995 |
| −12 | 2 | 126 | 125 | 16 | 2248 |
| −11 | 2 | 140 | 139 | 17 | 2501 |
| −10 | 2 | 154 | 153 | 18 | 2754 |
| −9 | 1 | 167 | 167 | 1 | 2989 |
| −8 | 1 | 181 | 181 | 2 | 3242 |
| −7 | 1 | 195 | 195 | 3 | 3495 |
| −6 | 1 | 209 | 209 | 4 | 3748 |
| −5 | 1 | 223 | 223 | 5 | 4001 |
| −4 | 1 | 237 | 237 | 6 | 4254 |
| −3 | 1 | 251 | 251 | 7 | 4507 |
| −2 | 15 | 265 | 251 | 260 | 4760 |
| −1 | 29 | 279 | 251 | 513 | 5013 |
| 1 | 42 | 292 | 251 | 748 | 5248 |
| 2 | 56 | 306 | 251 | 1001 | 5501 |
| 3 | 70 | 320 | 251 | 1254 | 5754 |
| 4 | 84 | 320 | 237 | 1507 | 5755 |
| 5 | 98 | 320 | 223 | 1760 | 5756 |
| 6 | 112 | 320 | 209 | 2013 | 5757 |
| 7 | 126 | 320 | 195 | 2266 | 5758 |
| 8 | 140 | 320 | 181 | 2519 | 5759 |
| 9 | 154 | 320 | 167 | 2772 | 5760 |
| 10 | 167 | 319 | 153 | 3007 | 5743 |
| 11 | 181 | 319 | 139 | 3260 | 5744 |
| 12 | 195 | 319 | 125 | 3513 | 5745 |
| 13 | 209 | 319 | 111 | 3766 | 5746 |
| 14 | 223 | 319 | 97 | 4019 | 5747 |
| 15 | 237 | 319 | 83 | 4272 | 5748 |
| 16 | 251 | 319 | 69 | 4525 | 5749 |
| 17 | 265 | 319 | 55 | 4778 | 5750 |
| 18 | 279 | 319 | 41 | 5031 | 5751 |
| 19 | 292 | 319 | 28 | 5266 | 5752 |
| 20 | 306 | 319 | 14 | 5519 | 5753 |
|  |  |  | 5760 |  |  |

FIG. 20

| Parallax number | 3D pixel number Start (left end) | End (right end) | Area width | LCD subpixel number Start (left end) | End (right end) |
|---|---|---|---|---|---|
| -28 | 2 | 9 | 8 | 21 | 245 |
| -27 | 2 | 22 | 21 | 22 | 662 |
| -26 | 2 | 34 | 33 | 23 | 1047 |
| -25 | 2 | 46 | 45 | 24 | 1432 |
| -24 | 2 | 58 | 57 | 25 | 1817 |
| -23 | 2 | 71 | 70 | 26 | 2234 |
| -22 | 2 | 83 | 82 | 27 | 2619 |
| -21 | 2 | 95 | 94 | 28 | 3004 |
| -20 | 2 | 108 | 107 | 29 | 3421 |
| -19 | 2 | 120 | 119 | 30 | 3806 |
| -18 | 2 | 132 | 131 | 31 | 4191 |
| -17 | 2 | 144 | 143 | 32 | 4576 |
| -16 | 1 | 157 | 157 | 1 | 4993 |
| -15 | 1 | 169 | 169 | 2 | 5378 |
| -14 | 1 | 181 | 181 | 3 | 5763 |
| -13 | 1 | 193 | 193 | 4 | 6148 |
| -12 | 1 | 206 | 206 | 5 | 6565 |
| -11 | 1 | 218 | 218 | 6 | 6950 |
| -10 | 1 | 230 | 230 | 7 | 7335 |
| -9 | 1 | 243 | 243 | 8 | 7752 |
| -8 | 1 | 255 | 255 | 9 | 8137 |
| -7 | 1 | 267 | 267 | 10 | 8522 |
| -6 | 1 | 279 | 279 | 11 | 8907 |
| -5 | 1 | 292 | 292 | 12 | 9324 |
| -4 | 1 | 300 | 300 | 13 | 9581 |
| -3 | 1 | 300 | 300 | 14 | 9582 |
| -2 | 1 | 300 | 300 | 15 | 9583 |
| -1 | 1 | 300 | 300 | 16 | 9584 |
| 1 | 1 | 300 | 300 | 17 | 9585 |
| 2 | 1 | 300 | 300 | 18 | 9586 |
| 3 | 1 | 300 | 300 | 19 | 9587 |
| 4 | 1 | 300 | 300 | 20 | 9588 |
| 5 | 9 | 300 | 292 | 277 | 9589 |
| 6 | 22 | 300 | 279 | 694 | 9590 |
| 7 | 34 | 300 | 267 | 1079 | 9591 |
| 8 | 46 | 300 | 255 | 1464 | 9592 |
| 9 | 58 | 300 | 243 | 1849 | 9593 |
| 10 | 71 | 300 | 230 | 2266 | 9594 |
| 11 | 83 | 300 | 218 | 2651 | 9595 |
| 12 | 95 | 300 | 206 | 3036 | 9596 |
| 13 | 108 | 300 | 193 | 3453 | 9597 |
| 14 | 120 | 300 | 181 | 3838 | 9598 |
| 15 | 132 | 300 | 169 | 4223 | 9599 |
| 16 | 144 | 300 | 157 | 4608 | 9600 |
| 17 | 157 | 299 | 143 | 5025 | 9569 |
| 18 | 169 | 299 | 131 | 5410 | 9570 |
| 19 | 181 | 299 | 119 | 5795 | 9571 |
| 20 | 193 | 299 | 107 | 6180 | 9572 |
| 21 | 206 | 299 | 94 | 6597 | 9573 |
| 22 | 218 | 299 | 82 | 6982 | 9574 |
| 23 | 230 | 299 | 70 | 7367 | 9575 |
| 24 | 243 | 299 | 57 | 7784 | 9576 |
| 25 | 255 | 299 | 45 | 8169 | 9577 |
| 26 | 267 | 299 | 33 | 8554 | 9578 |
| 27 | 279 | 299 | 21 | 8939 | 9579 |
| 28 | 292 | 299 | 8 | 9356 | 9580 |
|  |  |  | 9600 |  |  |

| Parallax number | 3D pixel number | | | LCD subpixel number | |
|---|---|---|---|---|---|
| | Start (left end) | End (right end) | Area width | Start (left end) | End (right end) |
| −12 | 2 | 2 | 1 | 2 | 2 |
| −11 | 2 | 45 | 44 | 3 | 390 |
| −10 | 2 | 87 | 86 | 4 | 769 |
| −9 | 2 | 130 | 129 | 5 | 1157 |
| −8 | 2 | 172 | 171 | 6 | 1536 |
| −7 | 2 | 214 | 213 | 7 | 1915 |
| −6 | 2 | 257 | 256 | 8 | 2303 |
| −5 | 2 | 299 | 298 | 9 | 3682 |
| −4 | 1 | 342 | 342 | 1 | 3070 |
| −3 | 2 | 384 | 383 | 11 | 3449 |
| −2 | 45 | 427 | 383 | 399 | 3837 |
| −1 | 87 | 469 | 383 | 778 | 4216 |
| 0 | 130 | 511 | 382 | 1166 | 4595 |
| 1 | 172 | 554 | 383 | 1545 | 4983 |
| 2 | 214 | 596 | 383 | 1924 | 5362 |
| 3 | 257 | 639 | 383 | 2312 | 5750 |
| 4 | 299 | 640 | 342 | 2691 | 5760 |
| 5 | 342 | 639 | 298 | 3079 | 5752 |
| 6 | 384 | 639 | 256 | 3458 | 5753 |
| 7 | 427 | 639 | 213 | 3846 | 5754 |
| 8 | 469 | 639 | 171 | 4225 | 5755 |
| 9 | 511 | 639 | 129 | 4604 | 5756 |
| 10 | 554 | 639 | 86 | 4992 | 5757 |
| 11 | 596 | 639 | 44 | 5371 | 5758 |
| 12 | 639 | 639 | 1 | 5759 | 5759 |
| | | | 5760 | | |

F I G. 32

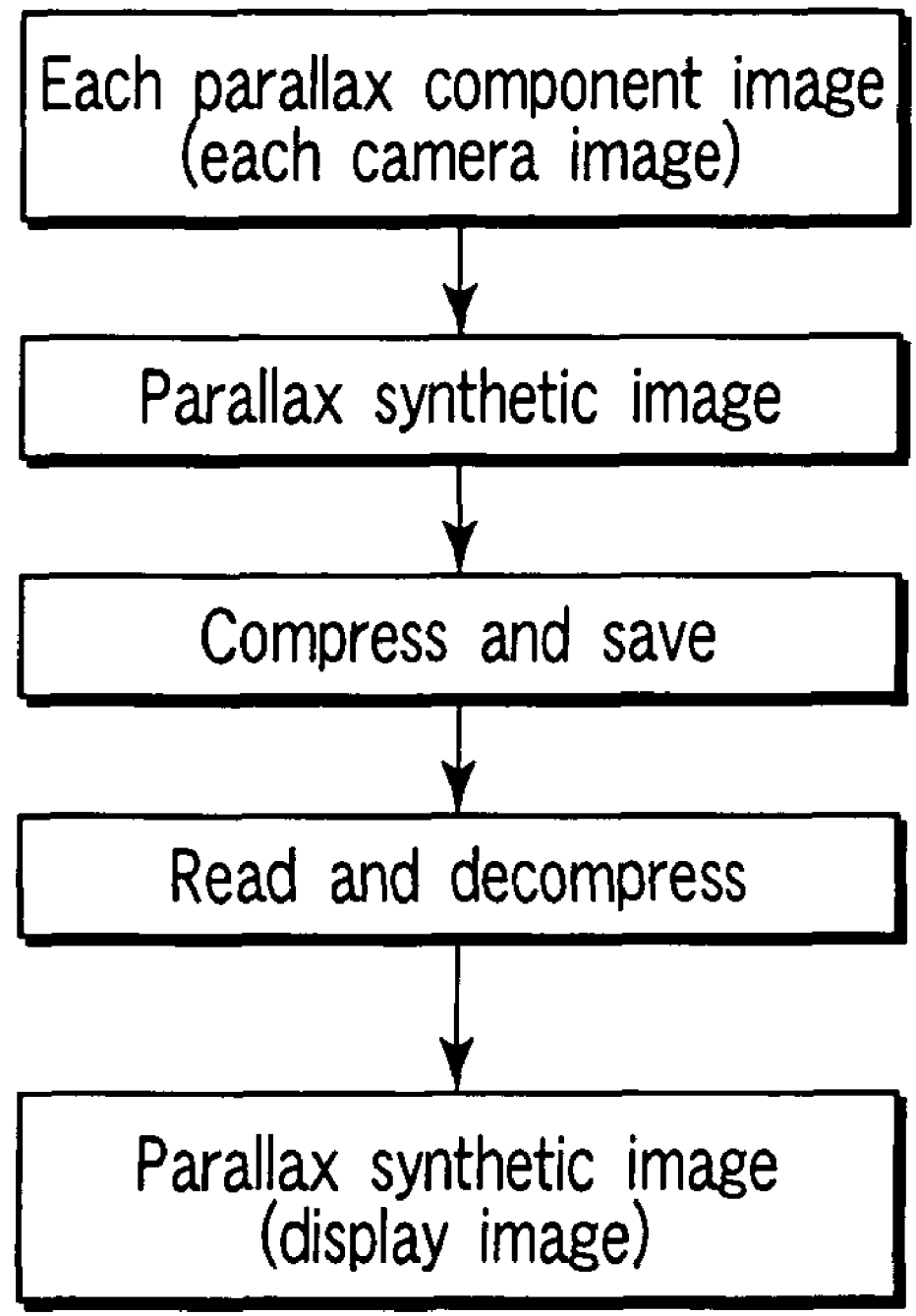
F I G. 36B

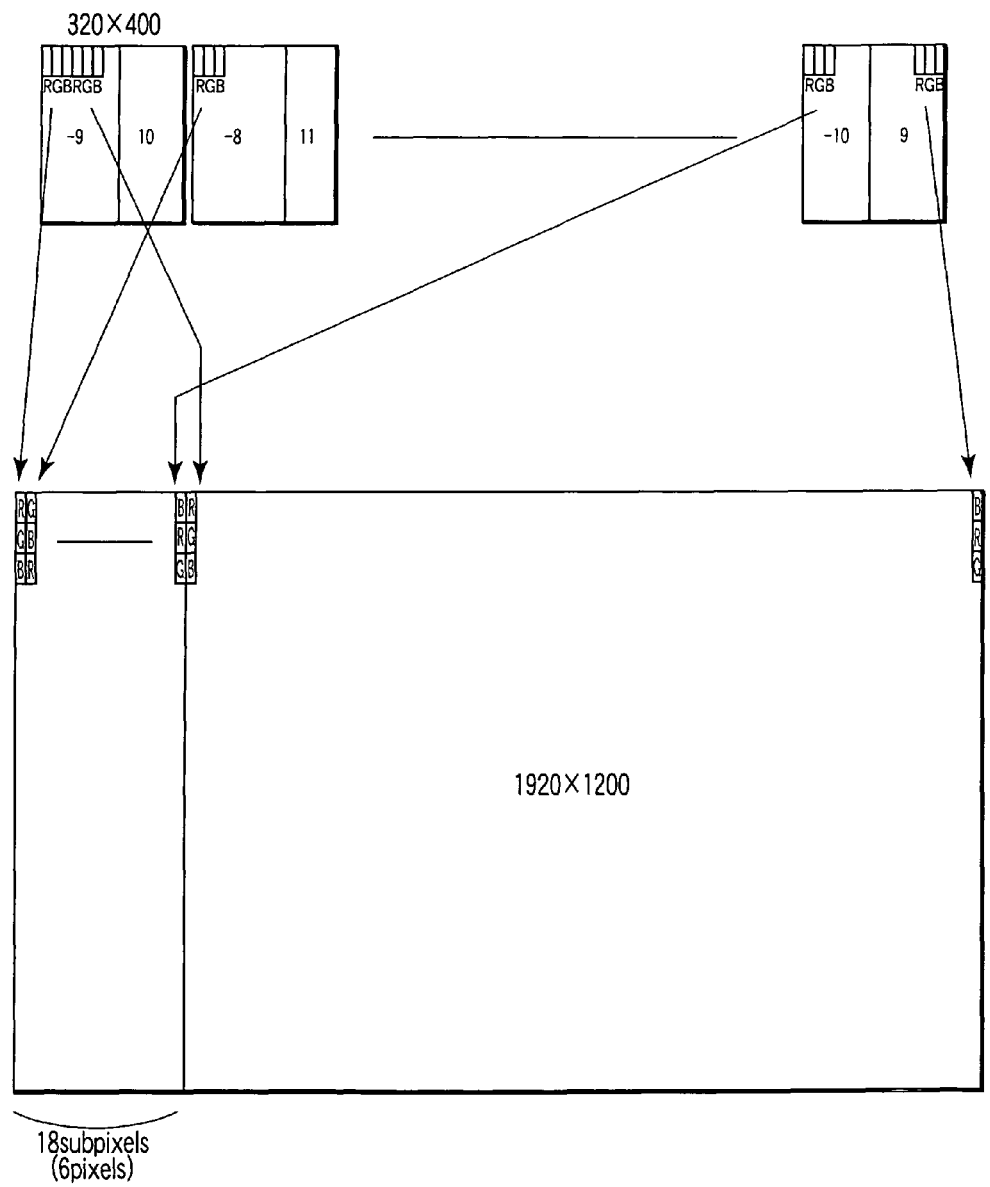
F I G. 37

STRUCTURE OF THREE-DIMENSIONAL IMAGE DATA, METHOD OF RECORDING THREE-DIMENSIONAL IMAGE DATA, AND METHOD OF DISPLAYING AND REPRODUCING THREE-DIMENSIONAL IMAGE DATA

CROSS-REFERENCE TO RELATED APPLICATIONS

This is a Continuation Application of PCT Application No. PCT/JP2005/017978, filed Sep. 29, 2005, which was published under PCT Article 21(2) in Japanese.

This application is based upon and claims the benefit of priority from prior Japanese Patent Application No. 2004-285246, filed Sep. 29, 2004, the entire contents of which are incorporated herein by reference.

BACKGROUND OF THE INVENTION

1. Field of the Invention

The present invention relates to the structure of three-dimensional image data, a method of recording three-dimensional image data, and a method of displaying and reproducing three-dimensional image data, and in particular, to the structure of three-dimensional image data, a method of recording three-dimensional image data, and a method of displaying and reproducing three-dimensional image data, wherein three-dimensional display images suitable for compression are recorded.

2. Description of the Related Art

Various schemes are known for three-dimensional image display apparatuses that are able to display motion pictures three-dimensionally, that is, three-dimensional displays. In recent years, in particular, three-dimensional image display apparatuses of a flat panel type have been highly demanded which are based on a scheme not requiring any dedicated type of glass or the like. For flat panel type display apparatuses such as direct-vision or projection type liquid crystal display apparatuses and plasma display apparatuses whose pixels have fixed position in display surfaces, three-dimensional image display apparatuses can be easily implemented on the basis of the following scheme: a parallax barrier is installed immediately in front of the display panel to controllably direct rays from the display panel toward a viewer.

Light rays are controlled so that even when observing the same position on the parallax barrier, the viewer views different images depending on the angle. Specifically, a slit array or lenticular sheet, that is, a cylindrical lens array, is used to provide only lateral parallaxes, that is, horizontal parallaxes, or a pinhole array or a lens array is used to also provide vertical parallaxes. The scheme using the parallax barrier is further classified into a two-view (binocular) scheme, a multiview scheme, a super-multiview scheme that is a multiview scheme provided with super-multiview conditions, and integral photography (hereinafter simply referred to as IP). The basic principle of these schemes is substantially the same as that which was invented about 100 years ago and has been used for three-dimensional photography since then.

With either the IP scheme or multiview scheme, viewing distance is normally finite. Consequently, a display image is created so that a perspective image is actually viewed at that viewing distance. An IP scheme providing only horizontal parallaxes and no vertical parallaxes is disclosed in SID04 Digest 1438 (2004). This one-dimensional IP scheme generates a set of parallel rays if the horizontal pitch of the parallax barrier is set equal to an integral multiple (n times) of the horizontal pitch of the pixels (the one-dimensional IP scheme is hereinafter also referred to as parallel-ray one-dimensional IP). Accordingly, a parallax component image in which pixel columns constituting a set of parallel rays are accumulated is obtained by perspective projection for a given viewing distance in the vertical distance and by orthographic projection in the horizontal direction. A parallax synthetic image (an elemental image array) is created by dividing each parallax component image obtained by the perspective projection in the vertical distance and by the orthographic projection in the horizontal direction, into pixel columns and interleaving and synthesizing. When the parallax image synthetic image is displayed on a display surface and observed through the parallax barrier, the correct projection, that is, a three-dimensional image based on perspective projection in both horizontal and vertical directions, is obtained. Specific methods are disclosed in SID04 Digest 1438 (2004), Jpn. Pat. Appln. KOKAI Publication Nos. 2003-90738 and 2003-315356, and the like. The multiview scheme divides an image obtained by a simple perspective projection, into pixel columns and interleaving and synthesizing to obtain a three-dimensional image based on the correct projection.

It is difficult to implement an image pickup apparatus that varies the projection method or a projection center distance between the vertical direction and the horizontal direction. This is because such an apparatus requires a camera or lens of the same size as that of a subject for orthographic projection. Accordingly, a practical method of obtaining orthographic projection data by image pickup is to convert perspective projection image pickup data into orthographic projection data. A known practical method is a ray space method based on interpolation and using EPI (epipolar surface).

The parallel-ray one-dimensional IP scheme is advantageous in that an image obtained by this scheme is easier to see than one obtained by the binocular scheme. However, the parallel-ray one-dimensional IP scheme requires complex image formats for the projection method and the dividing and arranging method. The binocular and multiview schemes are three-dimensional image display schemes that display the simplest three-dimensional images, and thus use simple image formats. With these schemes, each parallax image is formed of the same number of vertical pixels and the same number of horizontal pixels. For example, two parallax component images for the binocular scheme or nine parallax component images for the nine view scheme may be divided into pixel columns, which may then be synthesized into a parallax synthetic image in an image format in which the image can be displayed on the display surface. However, the parallel-ray one-dimensional IP scheme requires a larger number of parallax component images than the multiview scheme, which achieves substantially the same resolution. With the parallel-ray one-dimensional IP scheme, the number of horizontal pixels (horizontal range used to display three-dimensional images) in each parallax component image varies depending on parallax direction, resulting in complex image formats.

Both the multiview scheme and parallel-ray one-dimensional IP scheme pose a problem if each piece of parallax information is divided into subpixels assigned to a parallax synthetic image. When a parallax synthetic image is irreversibly compressed by an encoding method such as JPEG or MPEG, parallax information may be mixed together, and decompression may degrade image quality. In particular, if the color arrangement of color filters or the like are mosaic arrangement in order to avoid a moire effect, color information may also be mixed together, and decompression may further degrade image quality. Reversible compression avoids the degradation but offers a compression rate considerably lower than that achieved by the irreversible compression. A method exists which allows each parallax component image to be irreversibly compressed and decompressed. This method can be used with the multiview scheme but is inefficient with the parallel-ray one-dimensional IP scheme because it involves a large number of parallax component images and a varying number of horizontal pixels.

As described above, the conventional three-dimensional image recording method based on the parallel-ray one-dimensional IP scheme is disadvantageous in that it achieves a considerably low compression rate and may involve degradation of image quality as a result of irreversible compression and decompression.

BRIEF SUMMARY OF THE INVENTION

The present invention provides a structure of three-dimensional image data for a three-dimensional image display apparatus comprising:

a display section having a display surface on which pixels are arranged in a horizontal direction at a first horizontal pitch to display a parallax synthetic image for three-dimensional display; and a parallax barrier placed opposite the display surface and having linear optical openings arranged in the horizontal direction at a second horizontal pitch that is n (an integer) times as large as the first horizontal pitch, the parallax barrier parallelizing and directing rays from every n pixels arranged on the display surface along the horizontal direction, toward a viewing area, the apparatus displaying a three-dimensional image in the viewing area by providing parallaxes in the horizontal direction and not in a vertical direction, wherein the structure comprises data on n or more parallax component images in each of which pixel columns allowing the pixels to generate parallel rays in the same parallax direction in the viewing area are accumulated, the parallax component images having different numbers of horizontal pixels, and every n connected images each obtained by combining one or more parallax component images corresponding to n-th adjacent parallax directions are converted into a parallax synthetic image, the connected images having substantially the same number of vertical pixels and substantially the same number of horizontal pixels.

The present invention also provides a method of recording three-dimensional image data for a three-dimensional image display apparatus comprising a display section having a display surface on which pixels are arranged in a horizontal direction at a first horizontal pitch to display a parallax synthetic image for three-dimensional display, and a parallax barrier placed opposite the display surface and having linear optical openings arranged in the horizontal direction at a second horizontal pitch that is n (an integer) times as large as the first horizontal pitch, the parallax barrier parallelizing and directing rays from every n pixels arranged on the display surface along the horizontal direction, toward a viewing area, the apparatus displaying a three-dimensional image in the viewing area by providing parallaxes in the horizontal direction and not in a vertical direction, the method comprising:

providing data on n or more parallax component images in each of which pixel columns allowing the pixels to generate parallel rays in the same parallax direction in the viewing area are accumulated, the parallax component images having different numbers of horizontal pixels, and recording the data by converting every n connected images each obtained by combining one or more parallax component images corresponding to n-th adjacent parallax directions, into a parallax synthetic image, the connected images having substantially the same number of vertical pixels and substantially the same number of horizontal pixels.

BRIEF DESCRIPTION OF THE SEVERAL VIEWS OF THE DRAWING

FIG. 15 is a table showing the data range of each parallax component image and the position where it is located in a parallax synthetic image, in the method of recording a three-dimensional display image in accordance with the embodiment of the present invention.

FIG. 16 is a plan view schematically showing the format of a total connected image in a method of recording a three-dimensional display image in accordance with a variation of the embodiment of the present invention.

FIG. 20 is a table showing the data range of each parallax component image and the position where it is located in a parallax synthetic image, in the method of recording a three-dimensional display image described with reference to FIG. 19.

FIG. 29 is a table showing the data range of each parallax component image and the position where it is located in a parallax synthetic image, in the connected images shown in FIG. 18.

FIG. 30 is a plan view showing a total connected image obtained by connecting the connected images shown in FIG. 28.

FIG. 31 is a plan view showing a total connected image in accordance with a variation which is different from the total connected image shown in FIG. 30.

FIG. 32 is a table showing the data range of each parallax component image and the position where it is located in a parallax synthetic image, in a method of recording a three-dimensional display image in accordance with further another embodiment of the present invention.

FIG. 36B is a flowchart schematically showing a recording and reproducing method of irreversibly compressively recording, reading and decompressing, rearranging, and reproducing connected images or a total connected image created by a method of recording a three-dimensional display image in accordance with a comparative example.

FIG. 37 is a diagram schematically showing a method of assigning a group of connected groups to appropriate positions in a parallax synthetic image in accordance with an embodiment of the present invention.

DETAILED DESCRIPTION OF THE INVENTION

With reference to the drawings, description will be given of methods of recording and reproducing a three-dimensional display image in accordance with an embodiment of the present invention.

First, with reference to FIGS. 1 to 11, description will be given of a display apparatus and method in accordance with the IP scheme.

Figure 1:
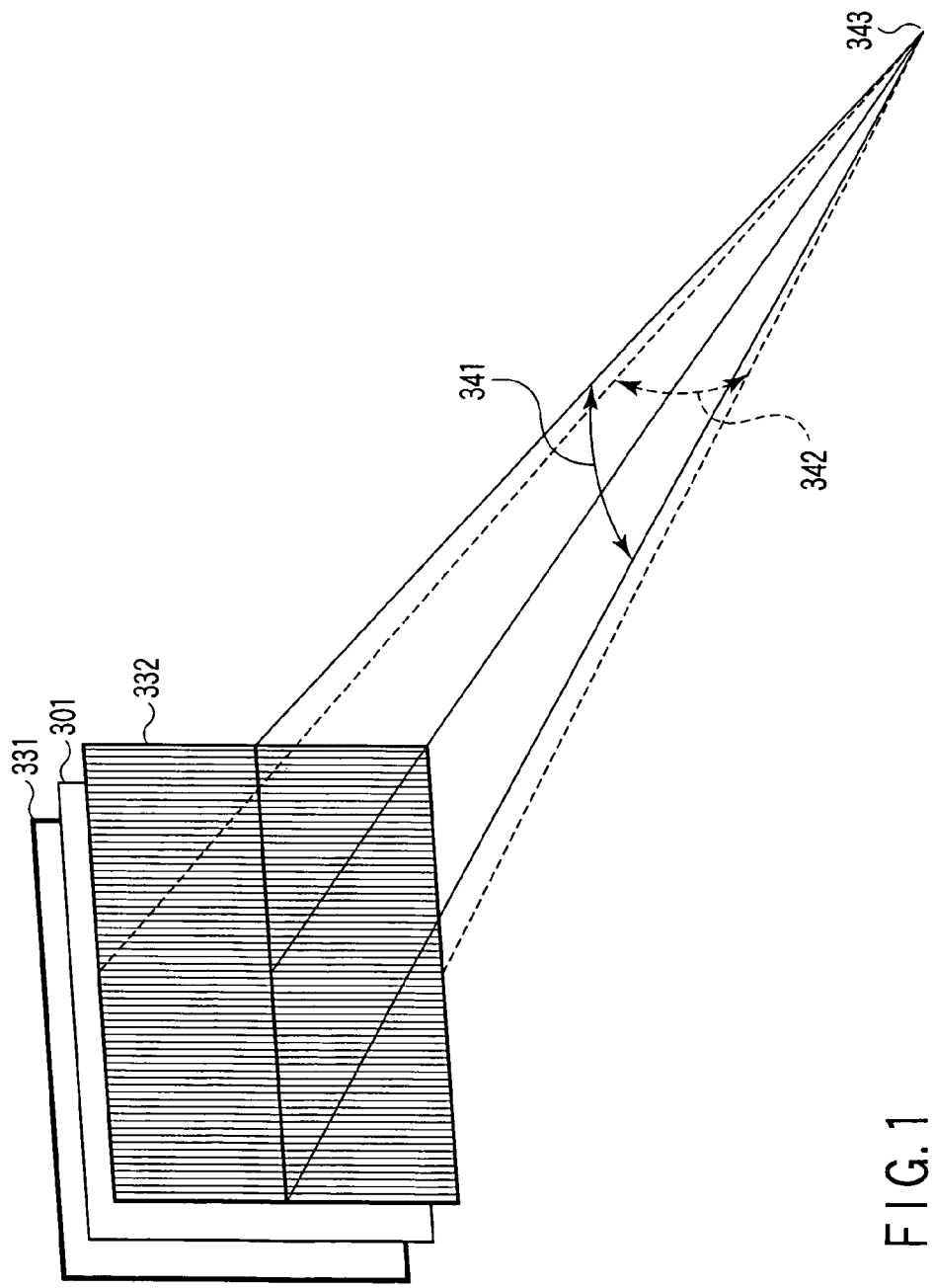
FIG. 1 is a perspective view schematically showing an entire three-dimensional image display apparatus to which methods of recording and reproducing a three-dimensional display image in accordance with an embodiment of the present invention are applied.
Figure 2A:
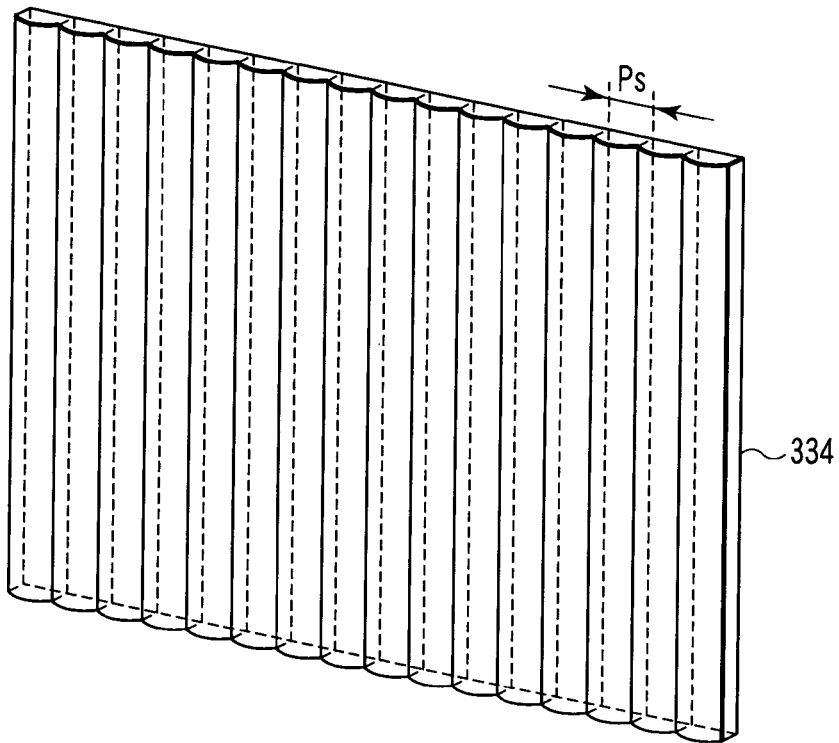
FIG. 2A is a perspective view schematically showing a lenticular sheet serving as a parallax barrier shown in FIG. 1.
Figure 2B:
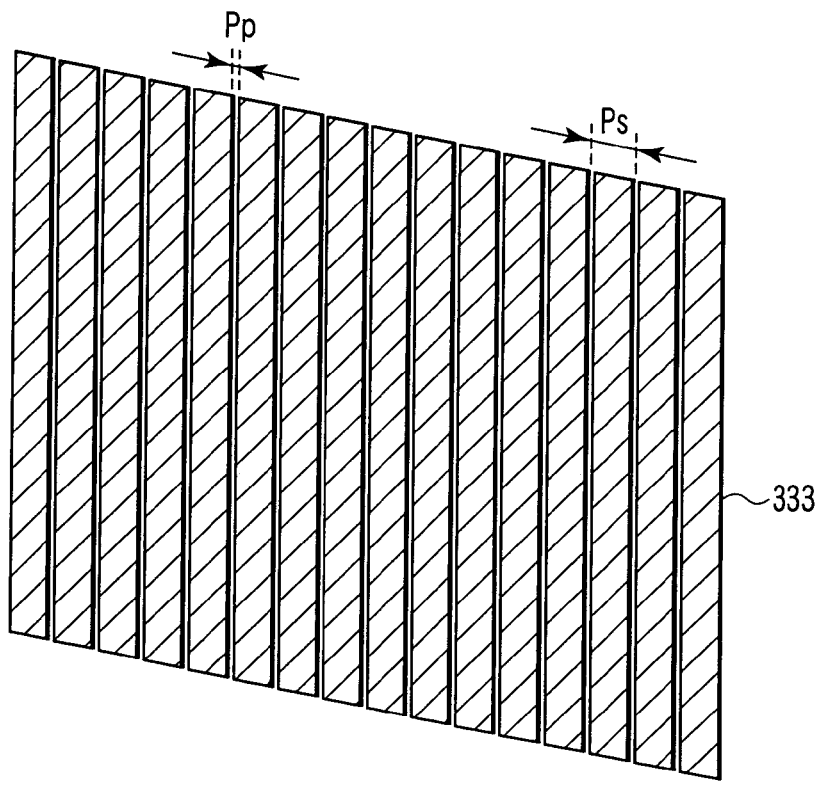
FIG. 2B is a perspective view schematically showing a slit array plate serving as the parallax barrier shown in FIG. 1.
Figure 3:
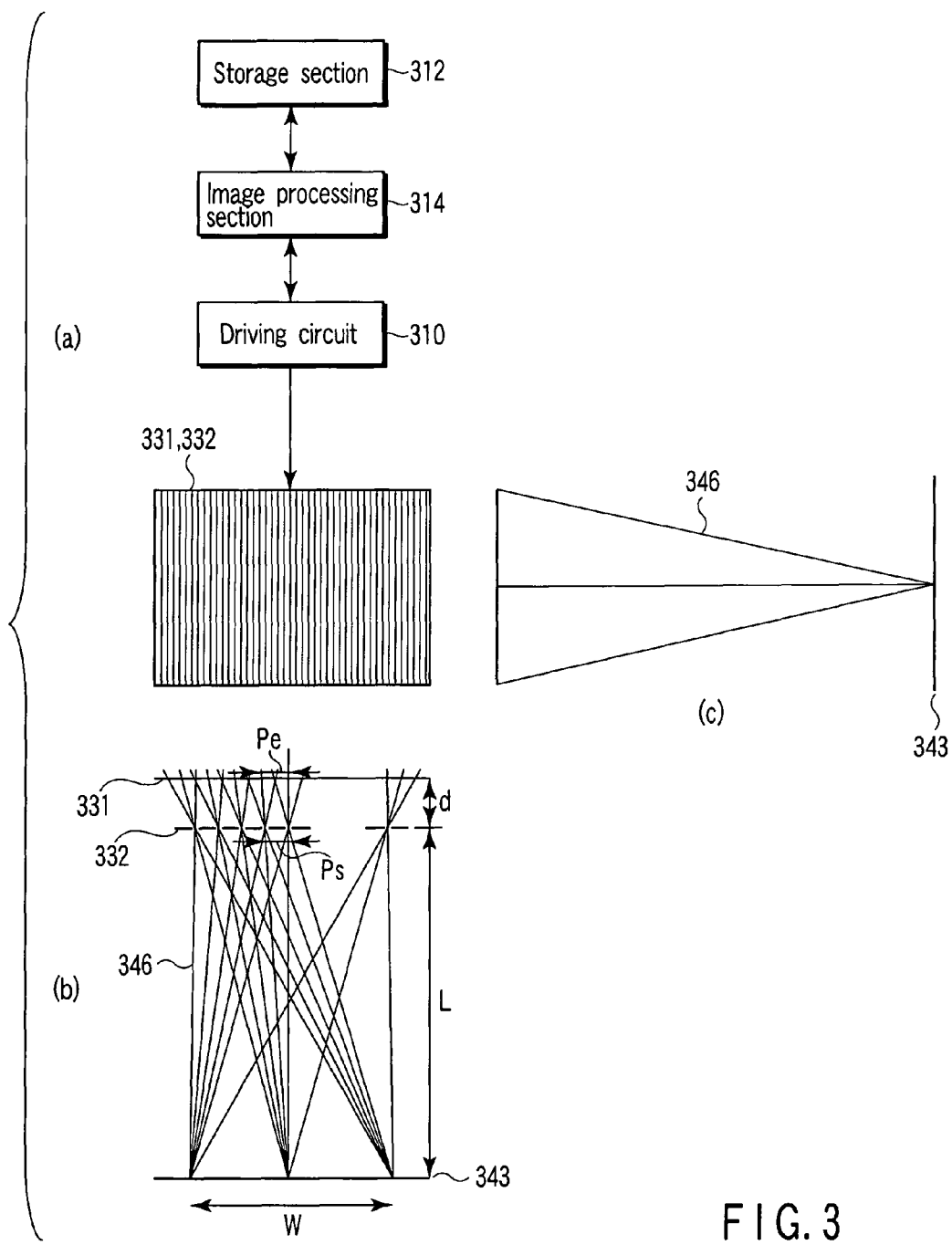
FIGS. 3(a), 3(b), and 3(c) are a plan view schematically showing a front surface of the three-dimensional image display apparatus to which the methods of recording and reproducing a three-dimensional display image in accordance with the embodiment of the present invention are applied, a schematic diagram showing construction lines and the arrangement, in a horizontal plane, of an optical system in the three-dimensional image display apparatus to which the methods of recording and reproducing a three-dimensional display image in accordance with the embodiment of the present invention are applied, and a diagram schematically showing an angle of view in a vertical plane in a viewing area space set on the basis of a display section of the three-dimensional image display apparatus in accordance with the embodiment of the present invention.
Figure 4:
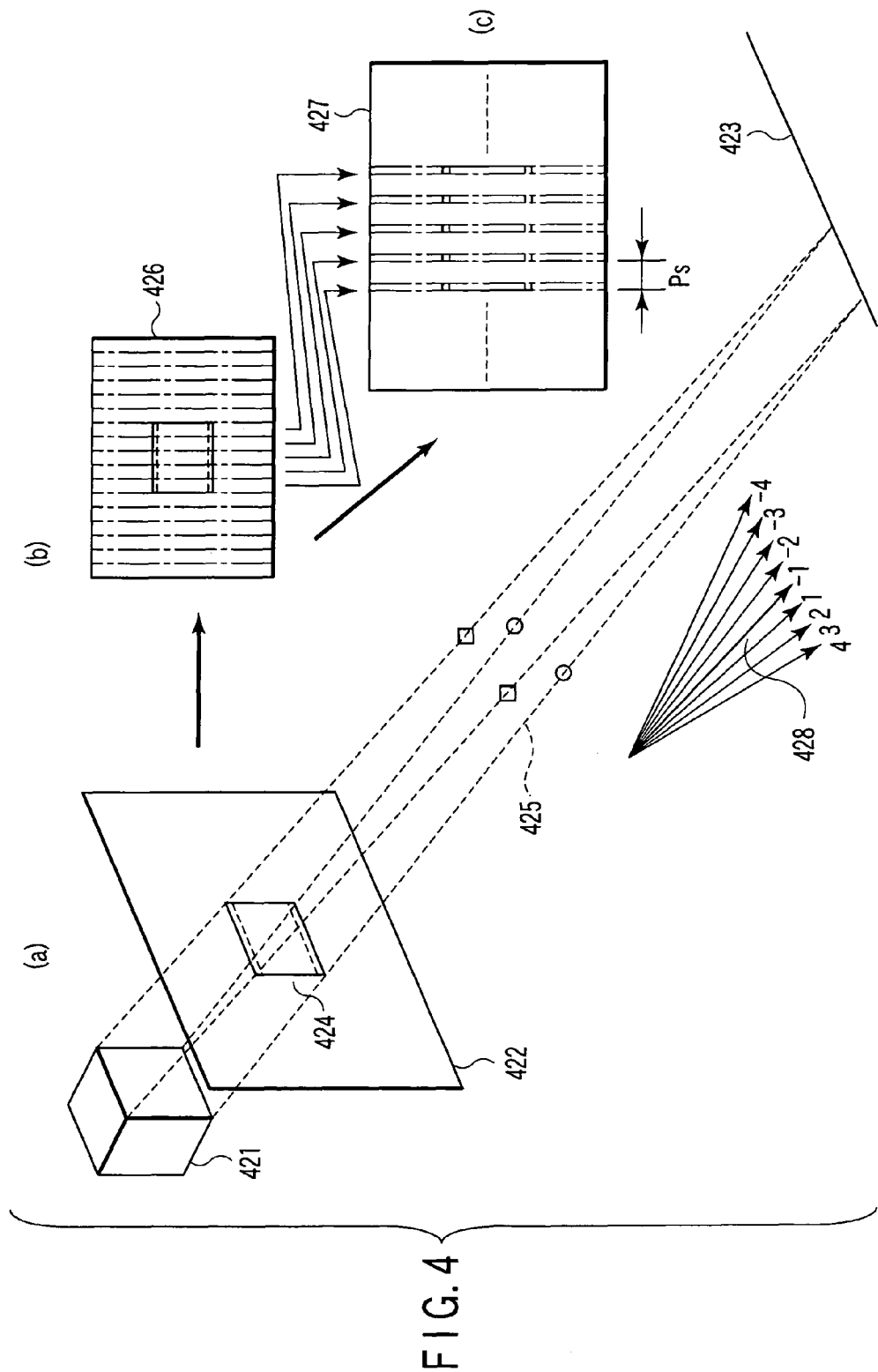
FIGS. 4(a), 4(b), and 4(c) are diagrams illustrating a method of forming a parallax synthetic image from parallax component images on the basis the parallel-ray one-dimensional IP scheme, in accordance with the embodiment of the present invention.

FIG. 1 is a perspective view schematically showing an entire three-dimensional image display apparatus. The display apparatus displaying a three-dimensional image shown in FIG. 1 comprises a planar display section 331 that displays a parallax synthetic image (elemental image array) as a planar image. A lenticular sheet 334 shown in FIG. 2A or a slit array plate 333 shown in FIG. 2B is placed in front of the planar display section 331 as a parallax barrier 332 that controls rays from the display section 331. Here, the lenticular lens 334 or the slit array plate 333 is collectively referred to as a parallax barrier 332. The parallax barrier comprises optical openings. If the parallax barrier is the lenticular sheet 334, the optical openings correspond to principal points (lines) of cylindrical lenses. If the parallax barrier is the slit array plate 333, the optical openings correspond to slits formed in the slit array plate 333. The optical openings in the parallax barrier 332 substantially limit rays from the display section 331 directed to a viewing area in which a three-dimensional image is displayed. The optical openings correspond to elemental images constituting a two-dimensional image displayed on the display section 331. A parallax synthetic image displayed on the display section 331 is thus composed of elemental images the number of which corresponds to the number of optical openings in the parallax barrier 332. As a result, the elemental images are projected toward a space in the viewing area via the optical openings in the parallax barrier 332 to display a three-dimensional image in a front or rear area of the three-dimensional image display apparatus.

In the three-dimensional image display apparatus, a diffusion sheet 301 may be provided between the planar image display section 331 and the parallax barrier 332 as required. The parallax barrier 322 may be installed behind the planar display section 331.

This three-dimensional image display apparatus is based on the one-dimensional IP scheme, with which a viewer observes a three-dimensional image provided with a horizontal parallax and not with a vertical parallax, from an eye point 343 on an assumed viewing distance L. FIG. 3(a) shows a front surface of the three-dimensional image display apparatus. FIG. 3(b) shows construction lines (group of straight lines 346) showing the relationship between the average width Pe of an elemental image, a second horizontal pitch (horizontal pitch of the openings in the parallax barrier) Ps, the viewing distance L, and the width W of the viewing area. FIG. 3(c) schematically shows an angle of view in a vertical plane in the viewing space set on the basis of the display section 331 of the three-dimensional image display apparatus shown in FIG. 3(a).

As shown in FIGS. 1 and 3(b), the three-dimensional image display apparatus comprises the planar display section 331, composed of a liquid crystal display panel or the like to display a planar image, and the parallax barrier 332, having the optical openings, as described above. The parallax barrier 332 is composed of the lenticular sheet 334 or slit array plate 333, shaped to have the optical openings extending like straight lines in a vertical direction and periodically arranged in a horizontal direction as shown in FIGS. 2A and 2B. For a projection type display apparatus, the parallax barrier 332 is composed of a curved mirror array or the like. With the three-dimensional image display apparatus, when observing the display apparatus 331 from the position of the eyes via the parallax barrier 332 within the ranges of the visual angle 341 in the horizontal direction and of the visual angle 342 in the vertical direction, the viewer can observe a three-dimensional image in front of and behind the display section 331. For the number of pixels in the planar image display section 331, a group of pixels constituting a minimum square unit contains, by way of example, 1,920 pixels in the horizontal direction and 1,200 pixels in the vertical direction. Each minimum-unit pixel group contains read (R), green (G), and blue (B) (sub) pixels. It should be noted that in the specification, "pixel" means a minimum unit within one frame of the display surface which allows its luminance to be independently controlled and that red (R), green (G), and blue (B) subpixels in a normal direct-view transmission liquid crystal panel correspond to "pixels".

In FIG. 3(b), the width of each elemental image can be determined by setting the distance (assumed viewing distance) L between the principal plane of the parallax barrier 332 and the viewing distance plane 343, the parallax barrier pitch (horizontal pitch of the optical openings in the parallax barrier 332) Ps, and a parallax barrier gap d. That is, the average pitch Pe of the elemental images is determined by the spacing between points obtained by projecting the centers of optical openings in the parallax barrier 332, on the display surface along straight lines from the eye point on the viewing distance plane 343 toward the optical opening centers. Reference numeral 346 denotes a line joining the eye point position with each optical opening center. The viewing area width W is determined under the condition that the elemental images do not overlap on the display surface of the display apparatus. As already described, each elemental image corresponds to a part of a two-dimensional synthetic image, that is, a parallax synthetic image, displayed by a set of pixels generating a flux of rays passing through certain optical openings in the parallax barrier 332 toward the viewing area between the parallax barrier 332 and the viewing distance plane 343. A three-dimensional image is displayed by displaying and projecting a plurality of elemental images on the display section 331.

The parallax synthetic image is displayed on the display apparatus 331 when it is driven in response to a display signal from a drive circuit 310 shown in FIG. 3(a). The drive circuit 310 comprises, as its peripheral device, a storage section 312 that compresses connected images composed of a group of parallax component images to store the compressed images as three-dimensional image data. The drive circuit 310 also comprises, as its peripheral circuit, an image processing section 314 that expands and converts the compressed three-dimensional image data from the storage section 312 into the connected images and further into a parallax synthetic image to extract pixel data.

With the parallel-ray one-dimensional IP scheme, in which the horizontal pitch Ps of the optical openings is set equal to an integral multiple of a pixel pitch Pp, the average pitch Pe of the elemental images corresponding to the optical openings and contributing to the display of a three-dimensional image is not an integral multiple of the pixel pitch Pp but is equal to an integral multiple plus a fraction. In the broad meanings of one-dimensional IP scheme, the horizontal pitch Ps of the optical openings may be not set equal to an integral multiple of the pixel pitch Pp, that is, the apertures arranged at the horizontal pitch Ps may not form a group of parallel rays. Even in the case of broad meanings of one-dimensional IP scheme, the average pitch Pe of the elemental images is generally similarly equal to an integral multiple plus a fraction. In contrast, with the multiview system, the average pitch Pe of the elemental images is set equal to an integral multiple of the pixel pitch Pp. With the one-dimensional IP scheme, an integer obtained by dividing the horizontal pitch Ps of the optical openings by the pixel pitch Pp is called the "number of parallaxes".

Each elemental image is composed of a set of pixel columns extracted from a parallax component image 426 and corresponding to the direction of each group of parallel rays as described with reference to FIGS. 4(a), 4(B), 4(c), and 5. As is understood, a parallax synthetic image required to display one three-dimensional image is a set of elemental images (also referred to as an elemental image array). The parallax synthetic image is also a set of a large number of parallax component images 426 constituting the elemental images, that is, a set of a large number of interleaved and synthesized parallax component images 426.

FIGS. 4(a), 4(b), and 4(c) show a method of constructing a parallax synthetic image on the basis of parallax component images in accordance with the parallel-ray one-dimensional IP scheme. As shown in FIG. 4(a), a displayed object, that is, a subject 421, is projected on a projection plane 422 located on a plane on which the parallax barrier 332 of the three-dimensional image display apparatus is actually placed. The one-dimensional IP projects the subject toward projection lines 425 extending toward a projection center line 423 specified as the center of a plane located parallel to the projection plane 422 and at the viewing distance L. With this projection, projection lines do not cross in the horizontal direction but cross at the projection center line in the vertical direction. This projection method creates an image 424 of the subject such as one shown in FIG. 4(b), on the projection plane 422 by perspective projection in the vertical direction and by orthographic projection in the horizontal direction. The image 424 of the subject shown in FIG. 4(b) corresponds to an image shown by reference numeral 1 in FIG. 4(a) and projected in a projection direction 428. The one-dimensional IP requires the image 424 of the subject projected in a plurality of directions as shown in FIG. 4(a).

As shown in FIG. 4(b), a projected image, that is, a parallax component image 426 is divided into pixel columns extending along the vertical direction; the projected image corresponds to an image for one direction projected on the projection plane 422 by perspective projection in the vertical direction and by orthographic projection in the horizontal direction. The pixel columns are distributed to the elemental images corresponding to the optical openings, that is, the apertures. The pixel columns are thus arranged in the parallax synthetic image 427. The parallax component images 426 are spaced, in terms of the length on the display surface 427 of the display apparatus, at the aperture pitches Ps, that is, the intervals ((sub)pixel column intervals the number of which is the same as the number of parallaxes) corresponding to the pitches Ps of the optical openings.

Figure 5:
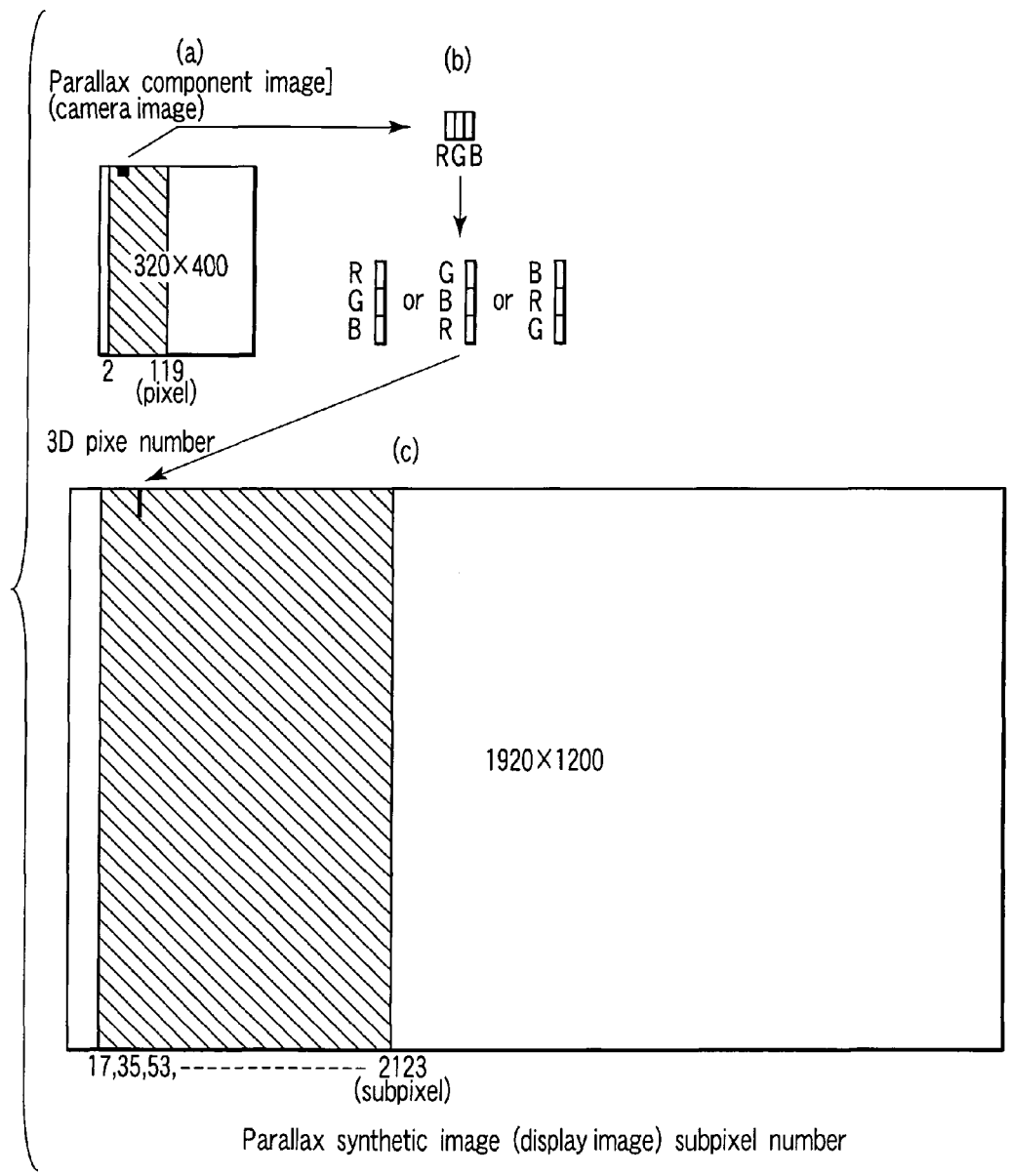
FIGS. 5(a), 5(b), and 5(c) are a diagram schematically illustrating parallax component images acquired by image pickup in accordance with the embodiment of the present invention, a diagram schematically illustrating a method of rearranging the color components of a pixel in the parallax component image shown in FIG. 5(a), and a diagram illustrating a method of assigning the parallax component image shown in FIG. 5(a) to an appropriate position in a parallax synthetic image.

The required resolution of each parallax component image is 1/(the number of parallaxes) of the required resolution of the parallax synthetic image. If colors are mosaically arranged on the display surface of the display apparatus, the horizontal and vertical resolutions of each parallax component image with respect to the parallax synthetic image are conveniently set at 3/(the number of parallaxes) and 1/3, respectively. The aspect ratio of a parallax component image is 1 only if the number of parallaxes is 9. FIG. 5 shows an example with 18 parallaxes. The number of horizontal pixels (subpixels) is thus 5,760 in the parallax synthetic image and 960, 1/6 of 5,760, in the parallax component image. As shown in FIGS. 5(a) and 5(b), R, G, and B subpixels in the parallax component image 426 (also corresponding to a camera image) acquired by image pickup are arranged in the horizontal direction (across the row). However, subpixel data from the R, G, and B subpixels are rearranged in the parallax synthetic image in this order in the vertical direction (across the column), for example, in the corresponding subpixels arranged in the vertical direction (the subpixel data may be rearranged in the order of G, B, and R or B, R, and G subpixel data). The subpixel data are assigned to a pixel column extending in the vertical direction. This conversion and assignment makes it possible to improve the horizontal resolution for the display of a three-dimensional image in accordance with the one-dimensional IP scheme, having only horizontal parallaxes. Horizontally adjacent pixels (a set of R, G, and B and a horizontally adjacent set of R, G, and B) in the parallax component image are arranged on the parallax synthetic image so as to separate from each other by a distance equal to the number of subpixels which is the same as the number of parallaxes. This operation is repeated for the other projection directions 428 to complete the entire parallax synthetic image as a two-dimensional image displayed on the display surface 427 as shown in FIG. 5(c). FIG. 4(a) shows only the eight projection directions 428 −4, −3, −2, −1, 1, 2, 3, and 4. However, several tens of directions are required depending on the viewing distance, and the example with the 18 parallaxes shown in FIGS. 5 to 18 requires 30 directions. However, the number of pixel columns in the projected image, that is, the parallax component image 426, is the largest value of the 3/(the number of parallaxes) of the number of pixel columns in the parallax synthetic image. However, only the columns within the required range need to be created in each of the projection directions. The required range is as described with reference to FIG. 13.

Each of the projection directions shown in FIG. 4(a) corresponds to the parallax direction in which the parallax component image 426 identified by the corresponding parallax number is observed. The angles between the directions are not equal but projection centers (corresponding to camera positions) are spaced at equal intervals on the viewing distance plane as described with reference to FIG. 14. That is, the projection centers are set at equal intervals by moving a camera parallel on the projection center line 423 at the equal intervals (in a fixed direction) in picking up images.

Figure 6:
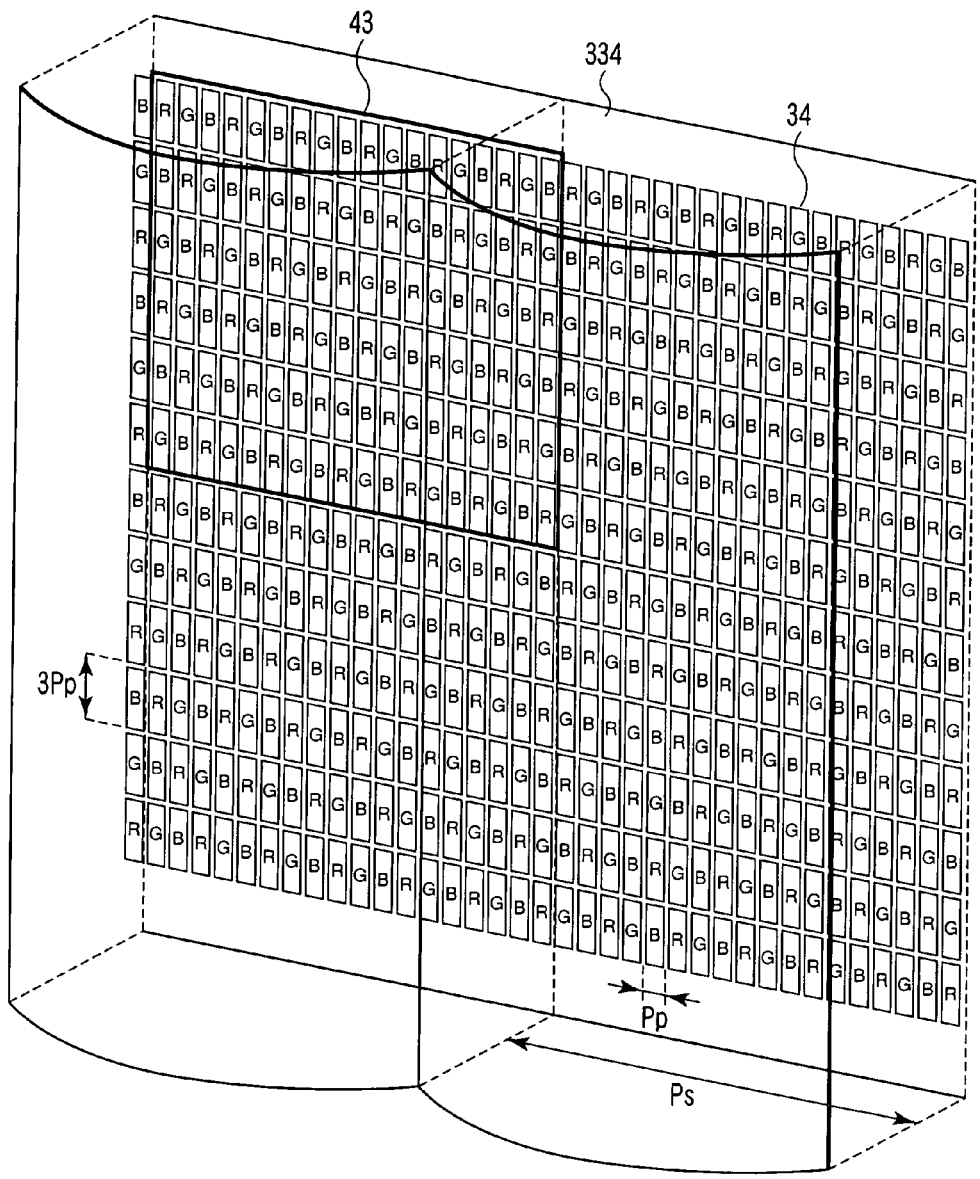
FIG. 6 is a perspective view schematically showing the configuration of a part of the three-dimensional image display apparatus to which the methods of recording and reproducing a three-dimensional display image in accordance with the embodiment of the present invention are applied.

FIG. 6 is a perspective view schematically showing the configuration of a part of the three-dimensional image display apparatus. This figure shows that the lenticular sheet 334, in which the optical openings consist of cylindrical lenses extending in the vertical direction, is placed, as the parallax barrier 332, in front of the display surface of a planar parallax synthetic image display section such as a liquid crystal panel. The optical openings in the parallax barrier 332 are not limited to the linear extensions shown in FIG. 6 but may be arranged obliquely or formed like steps. As shown in FIG. 6, pixels 34 with the aspect ratio of 3:1 are arranged in a matrix so as to extend linearly in both horizontal and vertical directions. The pixels 34 are arranged so that sets each of red (R), green (G), and blue (B) are alternately arranged in the horizontal direction within the same row and column. This color arrangement is generally called a mosaic arrangement.

Figure 7:
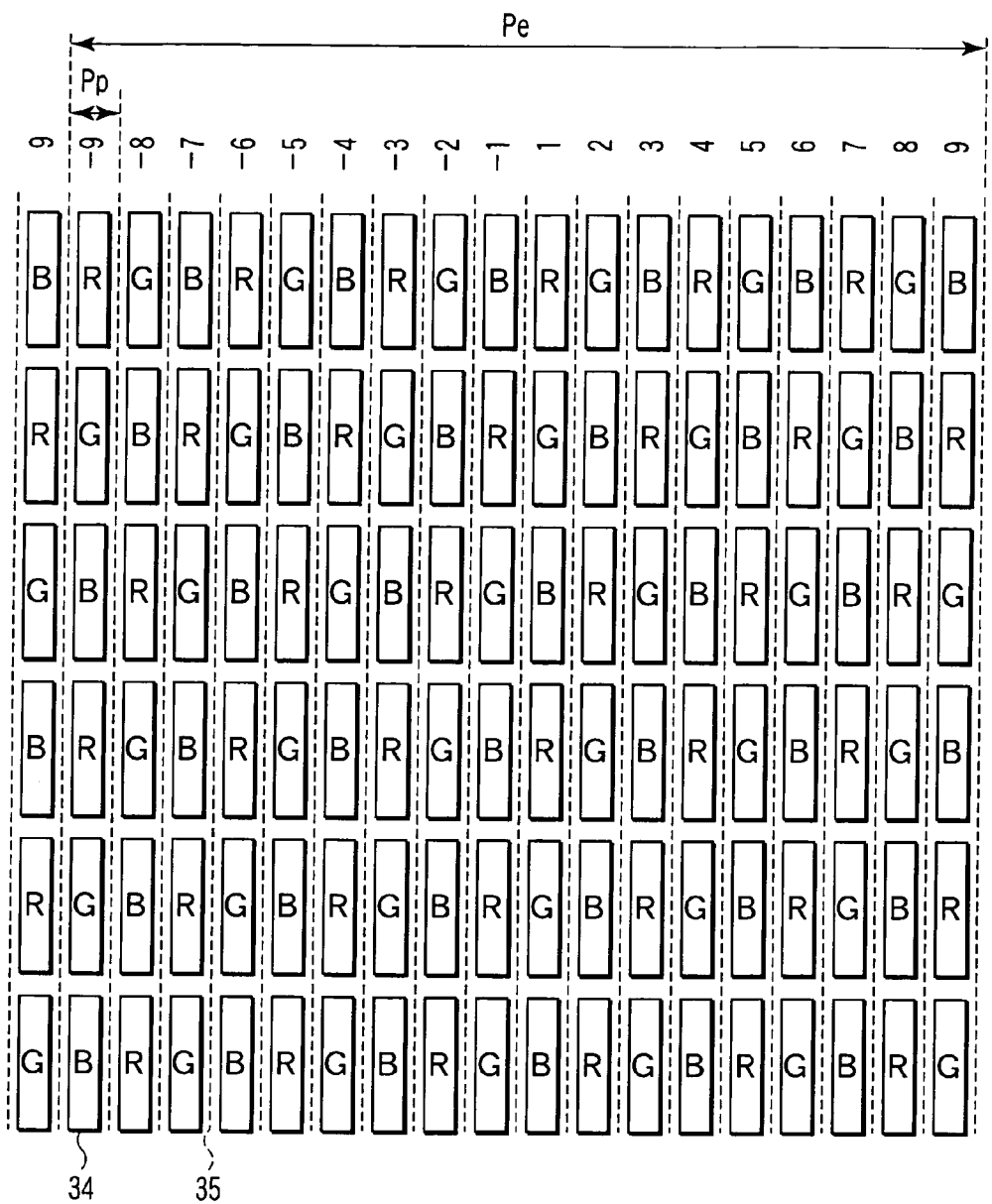
FIG. 7 is an enlarged plan view schematically showing an example of a pixel array on the display screen shown in FIG. 6.

FIG. 7 is an enlarged plan view showing an example of a pixel array on the display surface shown in FIG. 6. In FIG. 7, the numbers −9 to 9 shown on the columns of pixels 34 are the parallax numbers identifying the parallax component images described with reference to FIG. 4. The adjacent parallax numbers are assigned to the adjacent columns. In the array shown in FIG. 7, the vertical period of the pixels 34 along the column is set three times as large as the horizontal period Pp of the pixels along the row.

In the display screen shown in FIG. 6, 18 columns and 6 or 3 rows of pixels 34 constitute one effective pixel 43 (shown by a black frame in FIG. 6). This structure of the display section enables a three-dimensional image to be displayed with 18 parallaxes in the horizontal direction.

Figure 8:
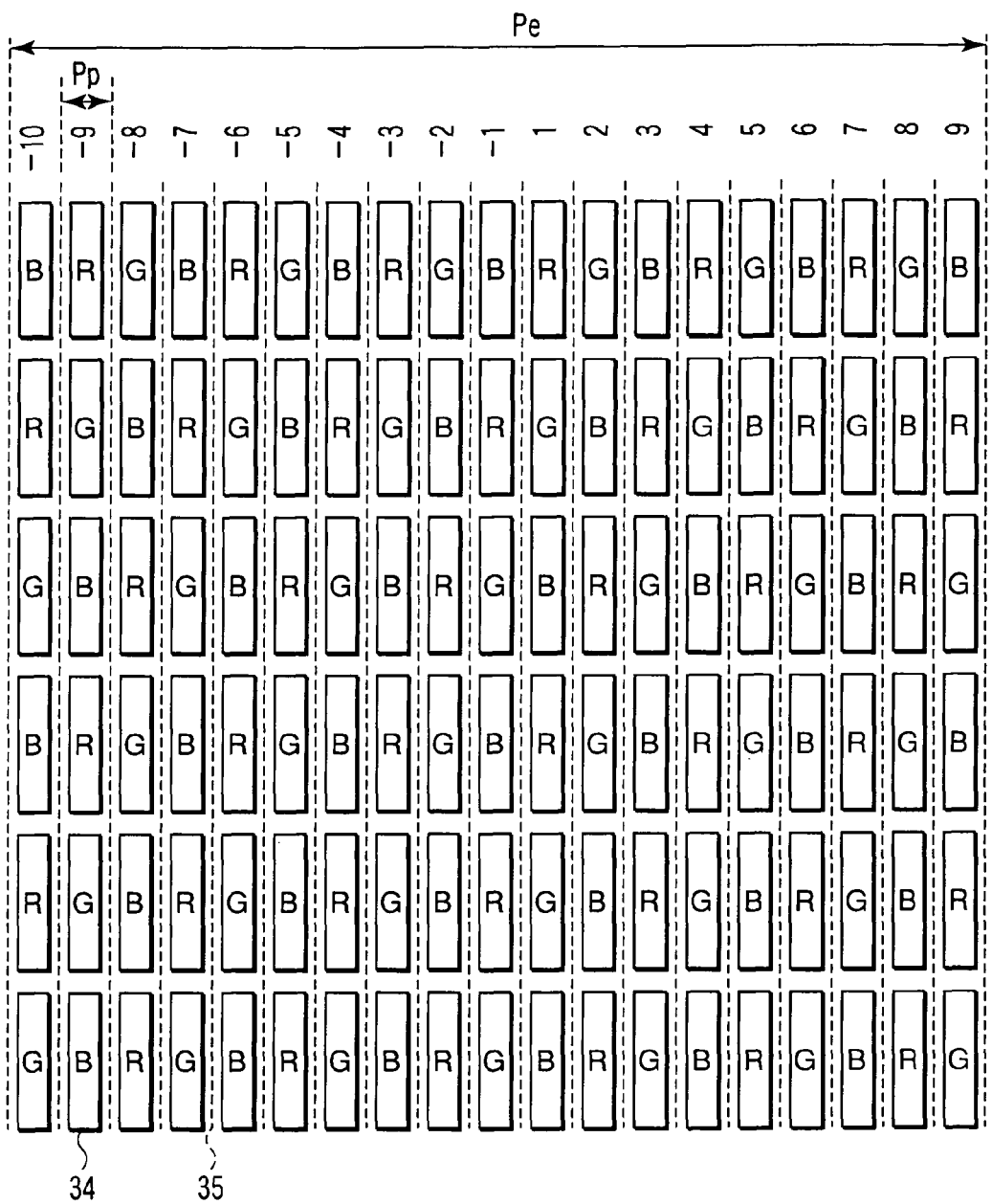
FIG. 8 is an enlarged plan view schematically showing an example of another part of the pixel array on the display screen shown in FIG. 6.

The parallel-ray one-dimensional IP scheme sets the parallax barrier pitch Ps equal to an integral multiple of the pixel pitch, that is, 18 pixel pitch. Beams emitted via the optical openings in the parallax barrier 332 thus become sets of parallel rays. With this design, the boundaries between elemental images occur at intervals each slightly larger than the 18 pixel width (for example, 18.02). However, since the effective pixels are specified in terms of pixels, the width of the effective pixel is set equal to 18 or 19 columns depending on a position in the display surface as shown in FIGS. 7 and 8. That is, the average value of the elemental image pitch is larger than the 18 pixel width. The horizontal pitch of the parallax barrier 332 is set equal to the 18 pixel width.

Figure 9:
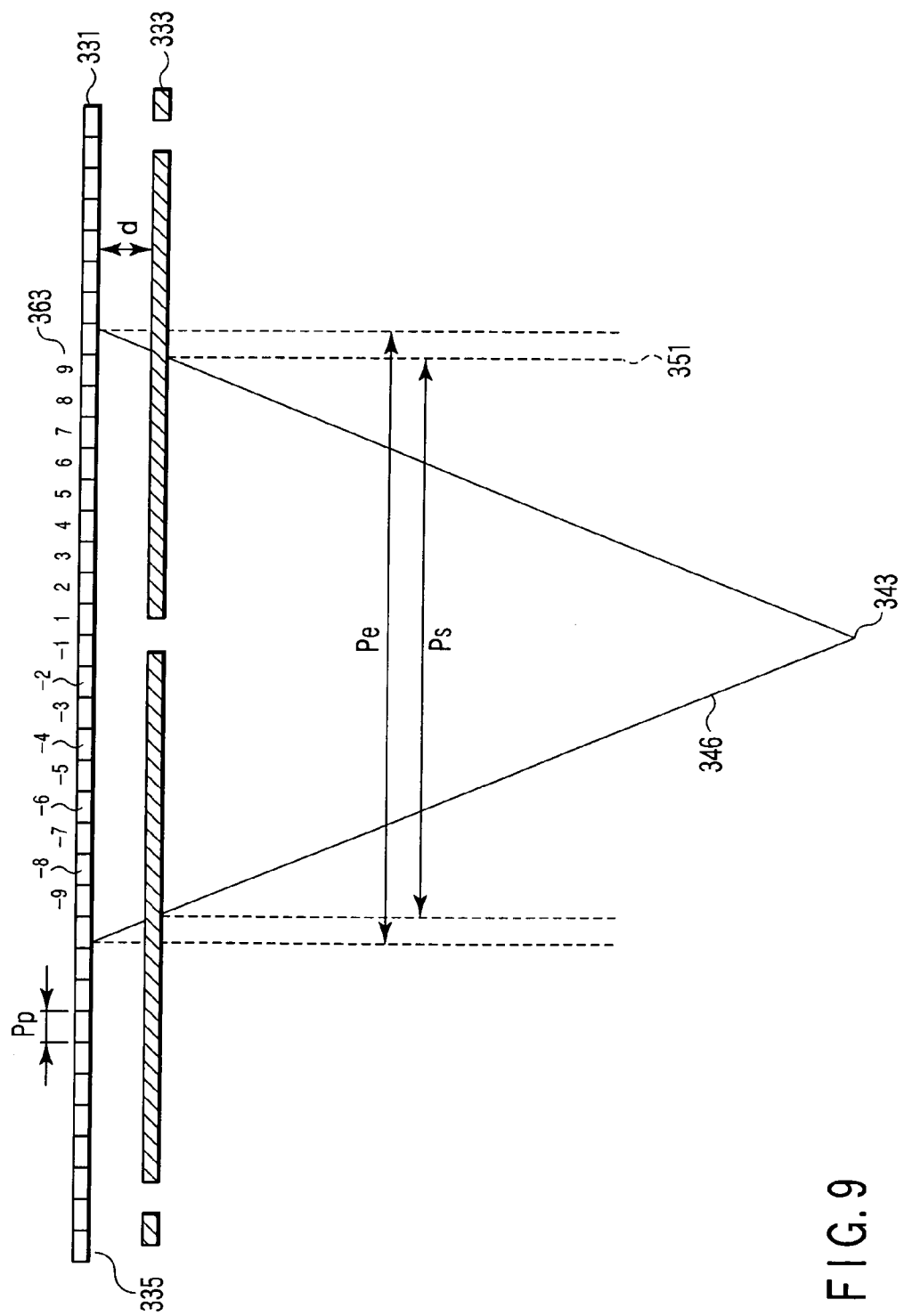
FIG. 9 is a schematic diagram schematically showing a horizontal cross section of the display section of the three-dimensional image display apparatus to which the methods of recording and reproducing a three-dimensional display image in accordance with the embodiment of the present invention are applied.
Figure 10:
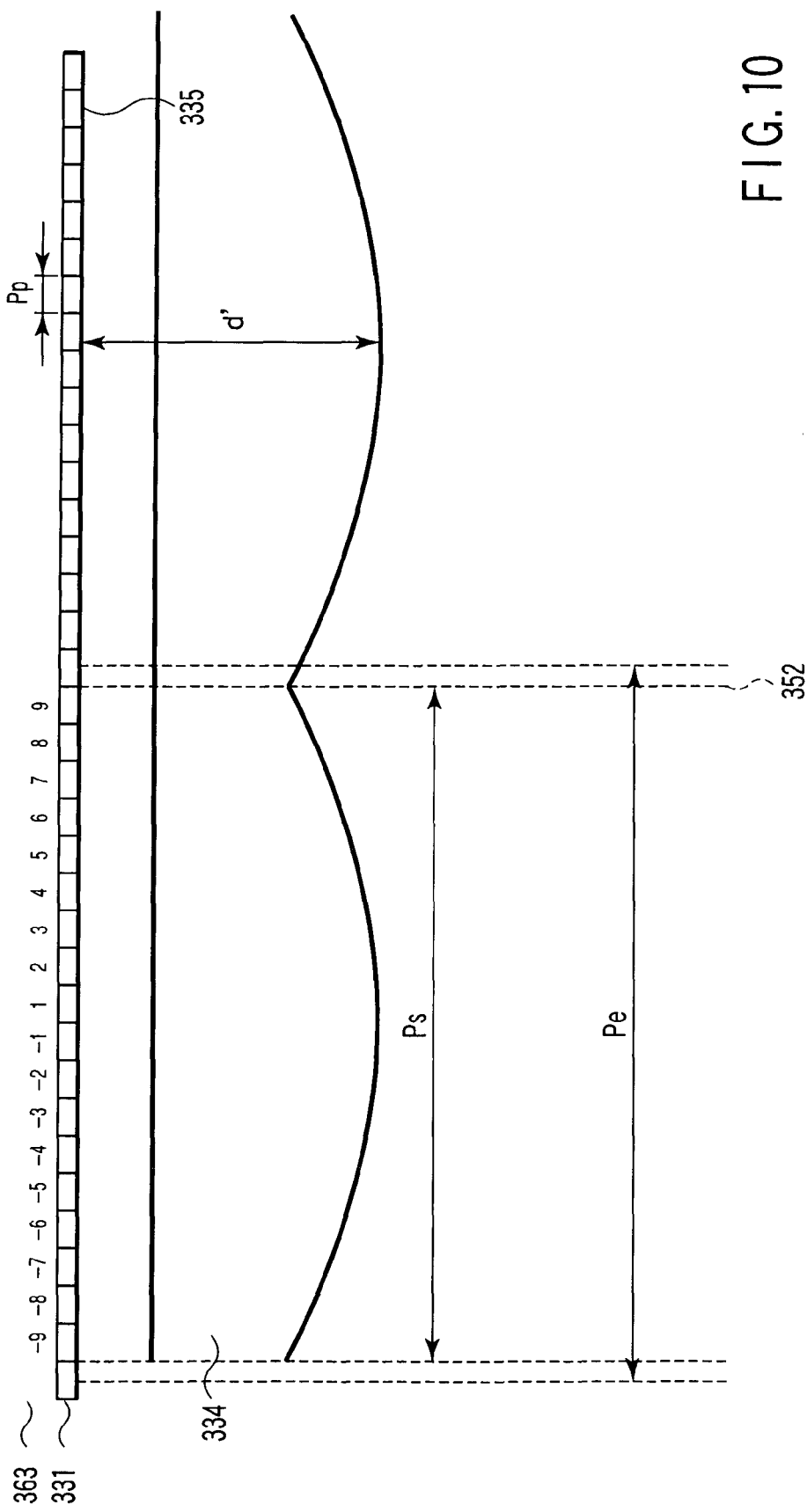
FIG. 10 is a schematic diagram schematically showing a horizontal cross section of the display section of the three-dimensional image display apparatus to which the methods of recording and reproducing a three-dimensional display image in accordance with the embodiment of the present invention are applied.

FIGS. 9 and 10 schematically show a horizontal cross section of the display section of the three-dimensional display apparatus. As shown in FIGS. 9 and 10, the pitch Ps (period) of the slits of the slit array plate 333 and the cylindrical lenses of the lenticular sheet 334 is set equal to an exact integral number of pixels (n×Pp; n is an integer). That is, center axes 351 each passing through the center of adjacent slits or reference axes 352 each passing through the boundary between the adjacent lenticular lenses pass through the pixel boundaries. An integral number of pixels are arranged in the area between the center axes 351 and between the reference axes 352. The horizontal pitch Ps (period) of the center axes 351 or reference axes 352 is fixed. In the example shown in FIG. 9 or 10, the pitch Ps is set equal to 18 pixels. The gap d between the display surface 331 of the display apparatus and the principal plane of the parallax barriers 333 and 334 is set at about 2 mm so as to be effective in a practical sense, based on the refractive index of the glass substrate or a lens material. The scheme in which the pitch Ps of the parallax barrier 332 is thus an integral multiple of the pixel pitch Pp corresponds to the one-dimensional IP as already described. The case in which the elemental image pitch Pe is an integral multiple of the pixel pitch Pp generally belongs to the multiview scheme.

Figure 11:
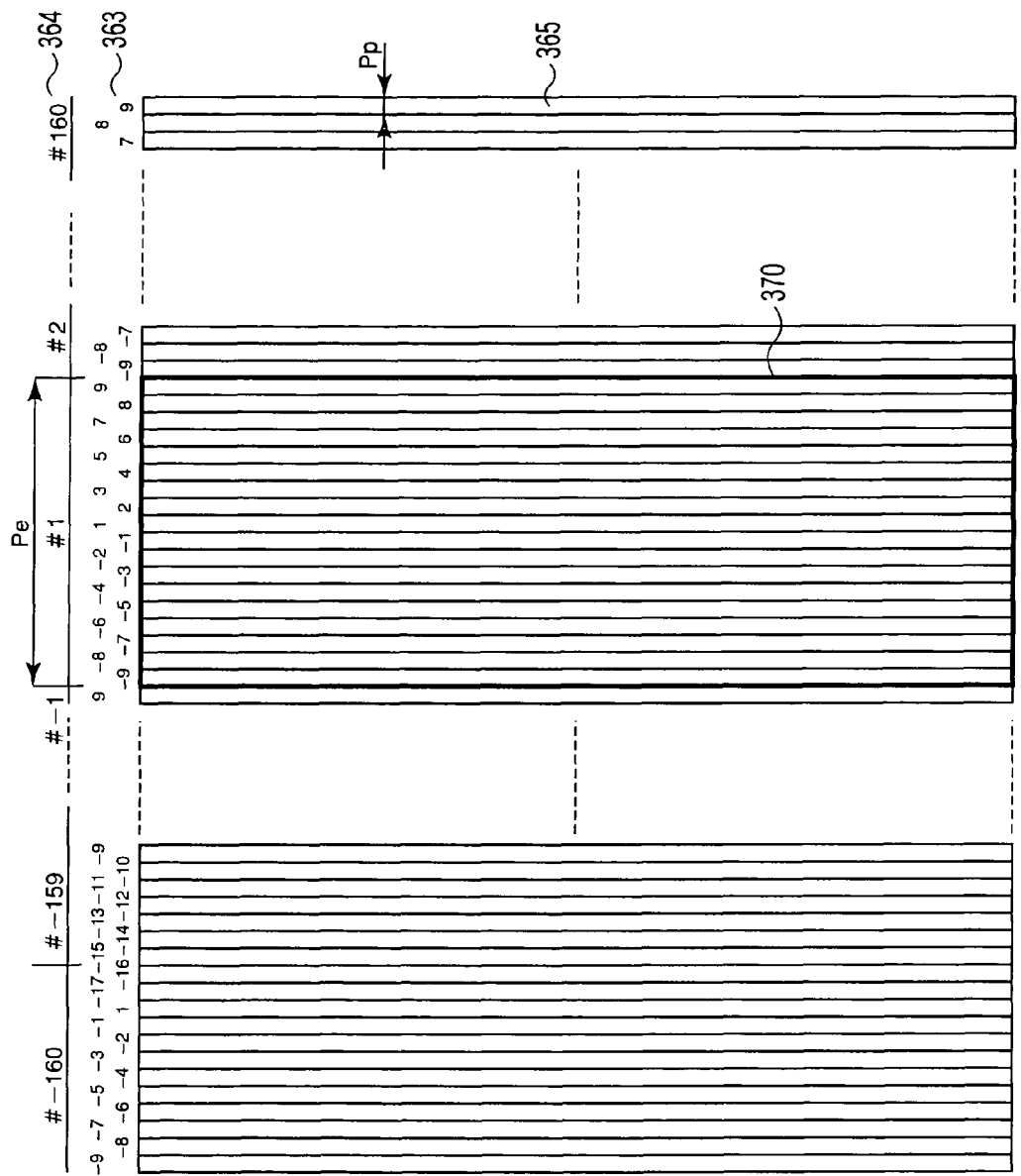
FIG. 11 is a front view schematically showing the display section of the three-dimensional image display apparatus, the view being useful in describing a method of arranging images in the display surface of the display apparatus in the methods of recording and reproducing a three-dimensional display image in accordance with the embodiment of the present invention are applied.

FIG. 11 is a front view showing the display section of the three-dimensional image display apparatus and which is useful in describing a method of arranging images in the display surface of the display apparatus in the parallel-ray one-dimensional IP scheme. The display surface of the display apparatus is partitioned into elemental images 370 corresponding to the apertures (openings in the parallax barrier 332). The elemental image 370 is composed of 18 or 19 pixel columns as already described. The number of apertures (optical openings) is 320, which is the same as the number of horizontal pixels (which are not subpixels in this case) in the parallax component image. The number of elemental images is also 320. The number of pixel columns in a parallax synthetic image 426 is 5,760 (number of subpixels). In FIG. 11, aperture numbers (elemental image numbers) are shown in an area denoted by reference numeral 364 in the drawing, in order to describe the 320 apertures in comparison with the elemental images 370. The range of the aperture numbers described in the area 364 (range of the numbers of a total of 320 apertures) is between #−160 and #−1 and between #1 and #160. In FIG. 11, parallax numbers (in this example, 15 to 1 and 1 to 15 for 30 directions) identifying parallax component images 426 are shown, as items, in an area denoted by reference numeral 363 in the drawing.

As is apparent from FIG. 11, the elemental image 370 with the aperture number #1 consists of 18 columns of parallax component images 426 identified by the parallax numbers −9 to −1 and 1 to 9. The elemental image with the aperture number #−159 consists of 18 columns in the parallax component image 426 identified by the parallax numbers −15 to −1 and 1 to 3. The average width Pe of the elemental images is slightly larger than the width of the 18 pixel columns. Consequently, when each elemental image boundary is aligned with the nearest pixel column boundary (normal A-D conversion method), the number of pixel columns in the elemental image with respect to the apertures is 18 for most apertures but 19 for some (see the description of FIGS. 7 and 6). The range of aperture numbers in the elemental image is shifted by one at every aperture number with 19 columns. Specifically, if the viewing distance is set at 1,000 mm, the aperture numbers with 19 columns are #14, #42, #70, #98, #125, #153, and these aperture numbers with the minus sign. The elemental images with the aperture numbers −160 and #160 are thus composed of 12 columns, smaller than the number of columns included in each of the other element images, by six corresponding to the shifted columns.

Now, with reference to FIGS. 12 to 25, description will be given of the configuration of image data in a format suitable for compression into which a parallax synthetic image displayed on the display section 331 has been converted.

Figure 12:
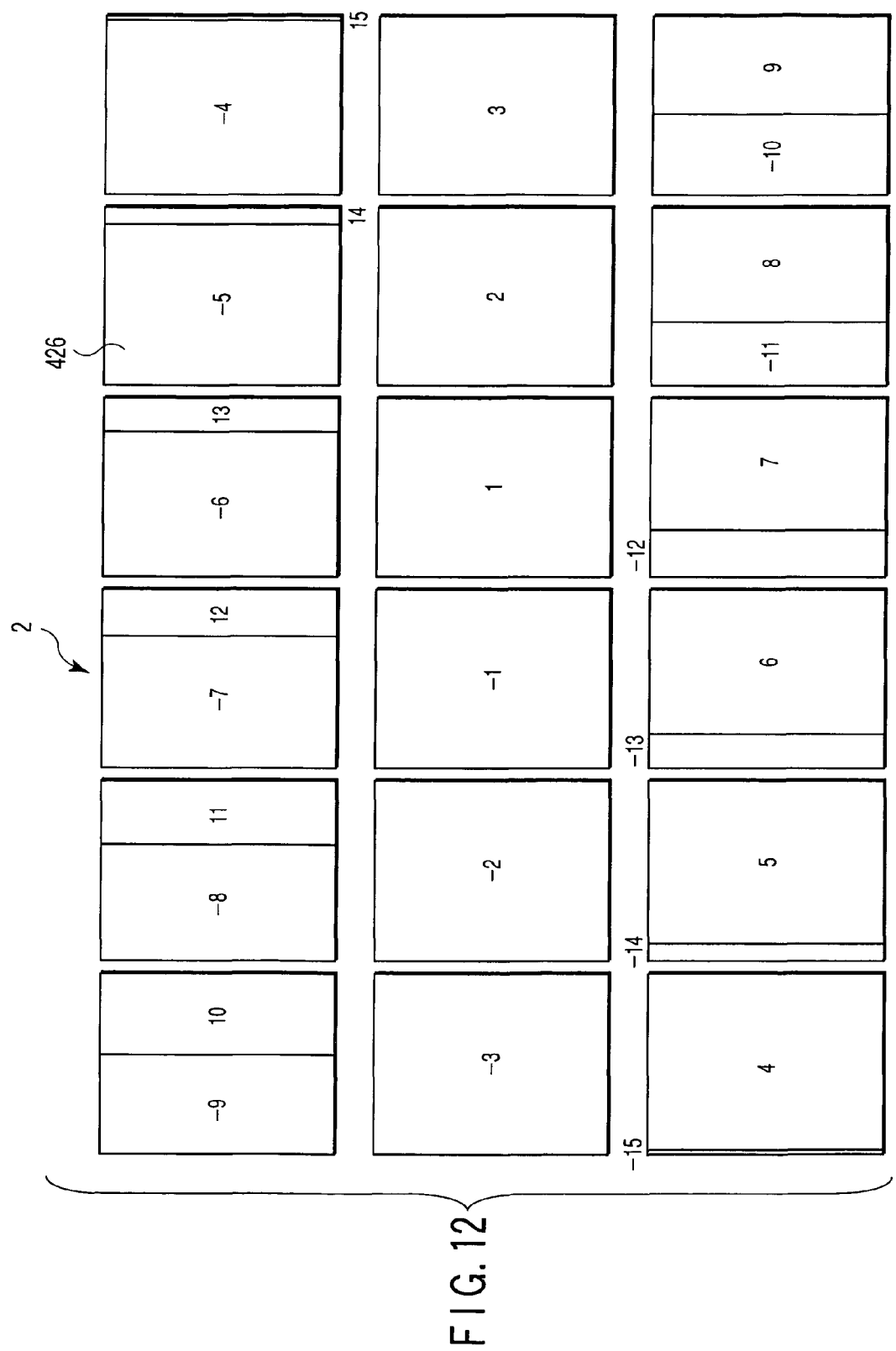
FIG. 12 is a plan view showing 18 connected images having the same number of vertical pixels and the same number of horizontal pixels, the set of images being suitable for recording a three-dimensional display image applied to the method of recording a three-dimensional display image in accordance with the embodiment of the present invention.

FIG. 12 shows n (in this example, n=18) connected images 2 having the same number of vertical pixels and the same number of horizontal pixels, which are suitable for recording a three-dimensional display image; the connected images 2 are applied to the method of recording a three-dimensional display image in accordance with the embodiment of the present invention. The number of connected images n corresponds to the number of parallaxes. Each of the connected images 2 is composed of one parallax component image 426 or a combination of several parallax component images 426 (+15 to +1 and −1 to −15). The n connected images 2 have a data structure formatted so as to be easily converted into one parallax synthetic image 426 displayed on the display section 331. The connected images can be converted into a parallax synthetic image by assigning the connected images 2 to appropriate positions on the display section 331 using a dividing and arranging method similar to the division and arrangement of a parallax component image described with reference to FIGS. 4(a) to 4(c) and 5(a) to 5(c). This conversion method is shown in FIG. 37. The pixels in the connected image containing the camera image (#−9) at the right end of the viewing area are arranged at 18-subpixel intervals from the left end column to right side of the parallax synthetic image so that the horizontally arranged subpixels with three color components are rearranged in the vertical direction. The pixels in the connected image containing the second camera image (#−8) from the right end of the viewing area are arranged at 18-subpixel intervals from the second column from the left end to the right side of the parallax synthetic image so that the horizontally arranged subpixels with three color components are rearranged in the vertical direction. A similar operation is repeated for each of the remaining connected images. Finally, the pixels in the connected image containing the camera image (#9) at the left end of the viewing area are arranged at 18-subpixel intervals from the 18-th column from the left end to the right end column of the parallax synthetic image so that the horizontally arranged subpixels with three color components are rearranged in the vertical direction. That is, the 18 connected images can be handled by exactly the same process as that for 18-view images based on the multiview scheme and can be converted into a parallax synthetic image by exactly the same interleave process. The connected images 2 are recorded in recording media so as to be arranged as shown in FIG. 12, or the array of the connected images 2 shown in FIG. 12 is compressed into one frame, or the frame and another frame obtained by compressing another array of connected images 2 are compressed so that the frames are correlated with each other.

The numbers (15 to 1 and −1 to −15) in FIG. 12 indicate the numbers of the parallax component images 426 (the same as the camera numbers). It should thus be noted that, in the description below, a combination of the numbers (15 to 1 and −1 to −15) of parallax component images 426 is used to identify a connected image 2. For example, the connected image 2 located at the upper left end of FIG. 12 is identified as the connected image (−9, +10). The connected image 2 at the right end of the middle stage is identified as the connected image (+3).

Figure 13:
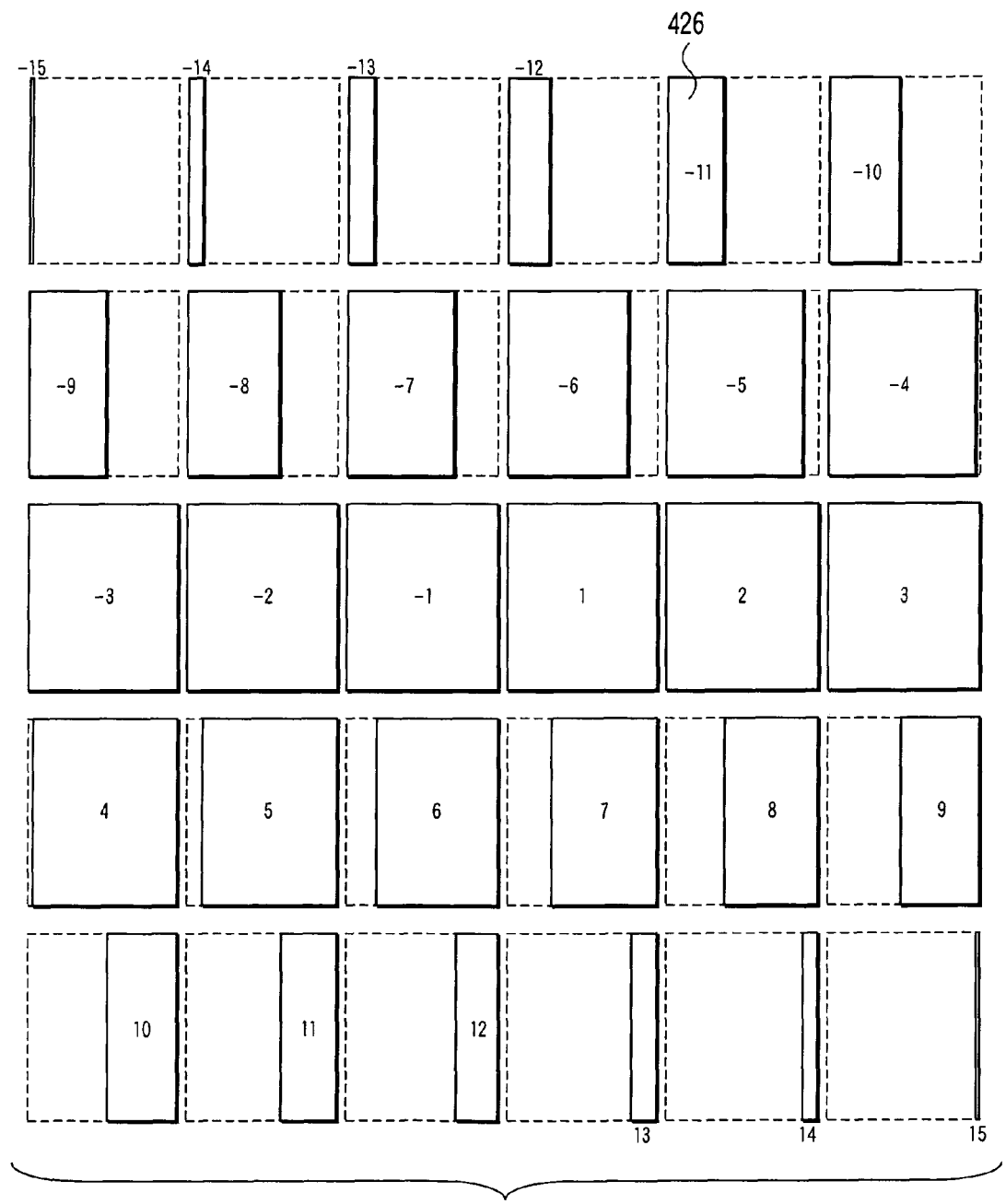
FIG. 13 is a plan view schematically showing parallax component images in the method of recording a three-dimensional display image in accordance with the embodiment of the present invention.
Figure 39A:
FIG. 39A is a diagram showing an example of 30 parallax component images in accordance with the embodiment of the present invention.

With the one-dimensional IP scheme, which emits parallel rays in the horizontal direction, the linearly extending parallax barrier 332 (lenticular plate) is placed in front of the display panel so that the optical openings (cylindrical lenses of the lenticular plate) are arranged at a horizontal pitch equal to an integral multiple of the horizontal pitch of the pixels (in this example, subpixels) arranged in the display surface, for example, at a horizontal pitch 18 times as large as that of the pixels. The one-dimensional IP scheme then reproduces a three-dimensional image by directing rays from every 18-th pixels corresponding to the above integral multiple, toward the viewing area along the horizontal direction of the display surface. Image data on the sets of pixels constituting parallel rays in the same parallax direction are accumulated in more than 18, for example, 30 parallax component images 426. As shown in FIG. 13, the parallax component images 426 for #−15 to #−1 and #+1 to #+15 have different numbers of horizontal pixels (used pixel range). FIG. 13 shows the size of used pixel range of each of the camera images containing the corresponding 30 parallax component images 426. In FIG. 13, solid lines show the used pixel range of each parallax component image 426. Broken lines show each camera image size equal to a display resolution achieved during three-dimensional display. Each parallax component image 426 is set to contain 320×400 pixels (not subpixels). The parallax component images 426 have the same number of vertical pixels but different numbers of horizontal pixels. Relevant specific values (used pixel range of 320 horizontal pixels) are shown in FIG. 15. The position (viewing area) in which the viewer can observe a three-dimensional image at a viewing distance corresponds to the width of middle 18 of the 30 cameras. The used pixel range falls within this viewing area. FIG. 39A shows an example of an actual image in the format shown in FIG. 13.

Figure 14:
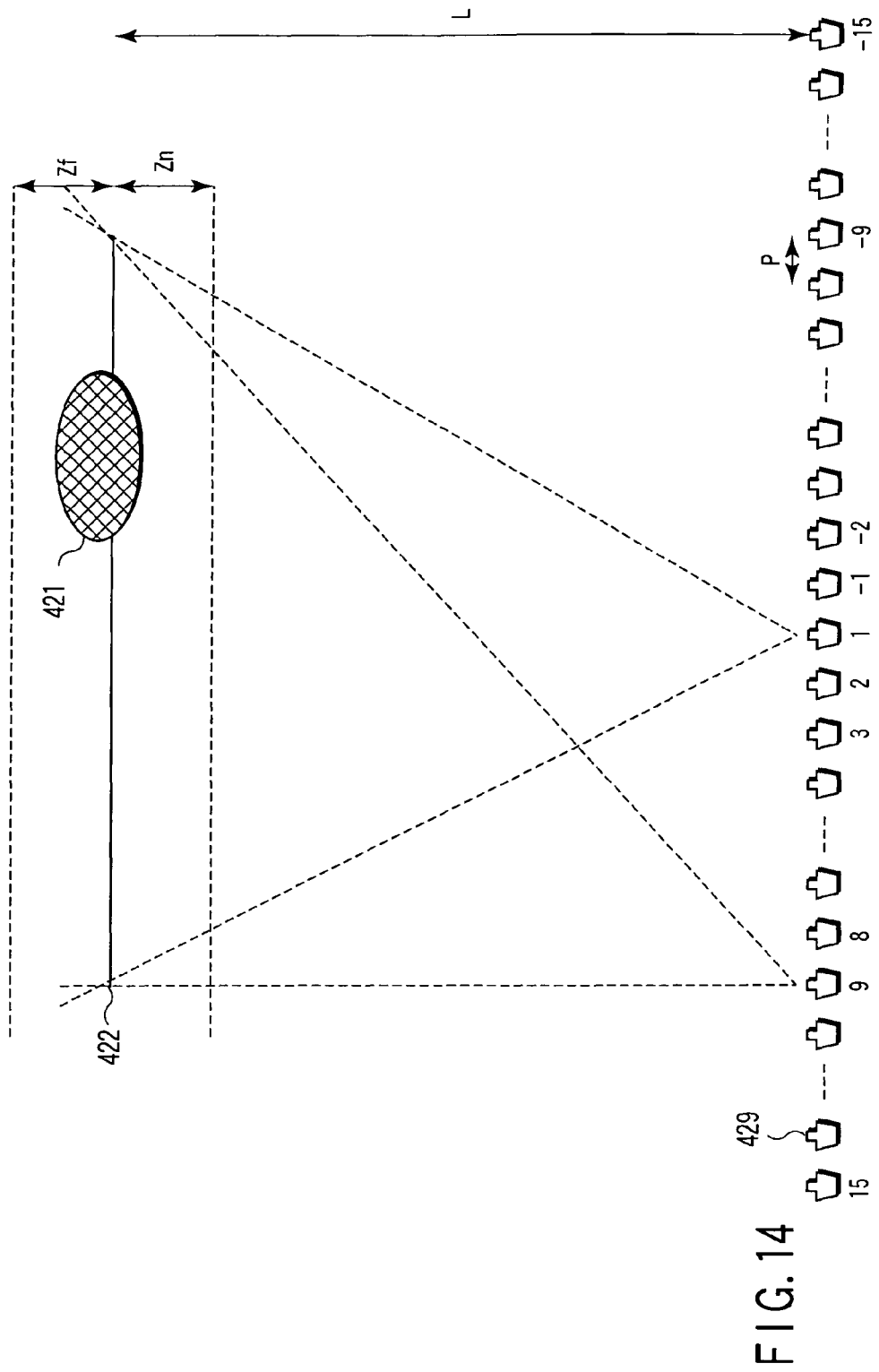
FIG. 14 is a schematic diagram illustrating an image taking method for acquiring each of the parallax component images shown in FIG. 13.

The parallax component images 426 constituting the connected images 2 shown in FIG. 13 are obtained using cameras arranged at a viewing distance L from the projection plane 422 (corresponding to a focal plane that allows the cameras to focus on the subject 421) as shown in FIG. 14; the parallax component images 426 are clipped from images picked up within the common projection plane range. All the cameras are directed parallel to one another and have a common projection plane. The cameras thus carry out shifted lens image pickup or allow shot selections after wide-angle image pickup. In FIG. 14, the image pickup positions of the camera are denoted by the camera numbers (#1 to #15 and #−1 to #−15). For the camera numbers (parallax direction numbers), if n is an even number, positive and negative numbers except 0 are arranged symmetrically with respect to the center of front surface of the display surface 422, as shown in FIG. 2. When the cameras pick up images of the subject 421 within the same projection plane range while moving at equal intervals on a horizontal image pickup reference line located at the viewing distance L from the subject 421, images of a spatial area containing the subject 421 are picked up. Since the camera numbers #1 and #−1 are located substantially in the center on the horizontal image pickup reference line, images picked up by the camera numbers #1 and #−1 are entirely covered by the viewing area for three-dimensional image display. The entire pixel ranges for the camera numbers #1 and #−1 are utilized as parallax component images 426 for #−1 and #+1. An increase or decrease in camera number increases the area of that part of an image picked up with respect to the projection plane 422 which is not covered by the viewing area. This reduces the used pixel range of the parallax component image 426, while increasing the range of unwanted pixels not utilized as the parallax component image 426 constituting the picked-up image. For example, for images picked up by the camera numbers #9 and #−9, the angle of view remains almost unchanged but the range covered by the viewing area is reduced to about half. The parallax component image 426 has a horizontal pixel range half that of the corresponding picked-up image. The remaining pixels constitute an unwanted pixel range for three-dimensional images to be displayed within the viewing area. FIG. 13 shows the relationship between the picked-up images and the parallax component images 426. As shown in FIG. 13, an increase or decrease in camera number reduces the range of horizontal pixels used as a parallax component image 426 clipped from the picked-up image. This increases the unwanted pixel range. If the cameras are moved on the horizontal image pickup reference line at equal intervals, a parallax component image 426 range and an unwanted pixel range which are complementary for the pixel range occur as shown in FIG. 13, in connection with the range of pixels used as a parallax component image clipped from the picked-up image and the range of unwanted pixels not utilized as a parallax component image 426. For example, an image picked up by the camera number #−5 involves a parallax component image 426 range and an unwanted pixel range that is equal to the parallax component image 426 range of an image picked up by the camera number #−14. A combination of the parallax component images 426 in the images picked up by the camera numbers #−5 and #−14 contains vertical and horizontal pixels the numbers of which are equal to those of vertical and horizontal pixels in the parallax component image 426 in the image picked up by the camera number #1.

The connected images 2 shown in FIG. 12 have the same number of vertical pixels and the same number of horizontal pixels as a result of combinations of parallax component images 426 separated from the picked-up images shown in FIG. 13. As is apparent from the comparison of the sizes (numbers of vertical and horizontal pixels) of the parallax component images 426 shown in FIG. 13, a combination of one or more parallax component images corresponding to the 18-th adjacent parallax directions enables a conversion into 18 connected images 2 having the same number of vertical pixels and the same number of horizontal pixels. For example, the connected image 2 shown in the upper left of FIG. 12 corresponds to the combination of #−9 and #10 with parallax direction numbers the difference between which is 18. The connected image 2 shown in the upper right of FIG. 12 corresponds to the combination of #−4 and #15 with parallax direction numbers the difference between which is 18. The parallax component image 426 clipped from the image picked up by the camera number located inside the viewing area is combined with another parallax component image 426 clipped from the image picked up by the camera number located outside the viewing area. However, the patterns in the parallax component images 426 are relatively continuous in the connected images particularly if the images have small parallaxes. This suppresses the degradation of image quality in the connection in spite of irreversible compression and decompression of the connected images. Several connected images 2 (six of the 18 connected images which have numbers #−3 to #3) are each composed of only one parallax component image 426. Since the connected images 2 have exactly the same number of vertical pixels and exactly the same number of horizontal pixels, they can advantageously be processed in exactly the same manner as multiview data in display apparatuses based on the multiview scheme.

FIG. 15 is a table showing the specific number of horizontal pixels (not subpixels) in each parallax component image 426 and the arrangement of the pixels (range of the horizontal pixels (subpixels)) on a parallax synthetic image. As already described with reference to FIG. 11, the table is created by calculating the average width (slightly larger than the width of 18 pixels) of the elemental images, determined on the basis of the assumed viewing distance L. As is apparent from the table shown in FIG. 15, the image with the parallax number −15 (corresponding to the camera number #−15 in FIG. 14; the parallax number identifies a parallax direction) has a size equal to the area of only the second to eighth of the 320 horizontal pixel columns, that is, a width equal to seven pixel columns, in the camera picked-up image shown in FIG. 13. The data of width equal to seven pixel columns is divided into columns assigned to the respective positions in the 13th to 121st subpixel columns in a parallax synthetic image (having a width equal to 5,760 subpixels), the adjacent positions being separated from each other at a distance corresponding to 18 subpixels. Three subpixels, R, G, and B subpixels, horizontally arranged in the parallax component image are rearranged in the vertical direction. Similarly, the image with the parallax number −11 has a size equal to the area of only the 2nd to 119th of the 320 horizontal pixel columns, that is, a width equal to 118 pixel columns, in the camera picked-up image shown in FIG. 13. The data of a width equal to 118 pixel columns is divided into columns assigned to the respective positions in the 17th to 2123rd subpixel columns in a parallax synthetic image (having a width equal to 5,760 subpixels), the adjacent positions being separated from each other at a distance corresponding to 18 subpixels. The R, G, and B subpixels are rearranged in the vertical direction. One of the connected images 2 shown in FIG. 12 is, for example, a combination of the parallax numbers −15 and 4. The sum of the area widths (number of horizontal pixels) in the combination of the parallax numbers −15 and 4 is 7+313=320. Further, a connected image 2 shown in FIG. 12 is a combination of the parallax numbers −11 and 8. The sum of the area widths in the combination of the parallax numbers −11 and 8 is 118+202=320. Similarly, the sum of the area widths in the combination of the parallax numbers −14 and 5 is 35+285=320. Similarly, the sum of the area widths in any other combination is 320.

In the above description, to meet the requirements of the design, each parallax component image 426 needs to be obtained by perspective projection in the vertical direction in association with the assumed viewing distance L or a nearby viewing distance and by orthographic projection in the horizontal direction. However, the image may be obtained by perspective projection in both vertical and horizontal direction if the distortion of the three-dimensional image is unmarked.

Figure 16:
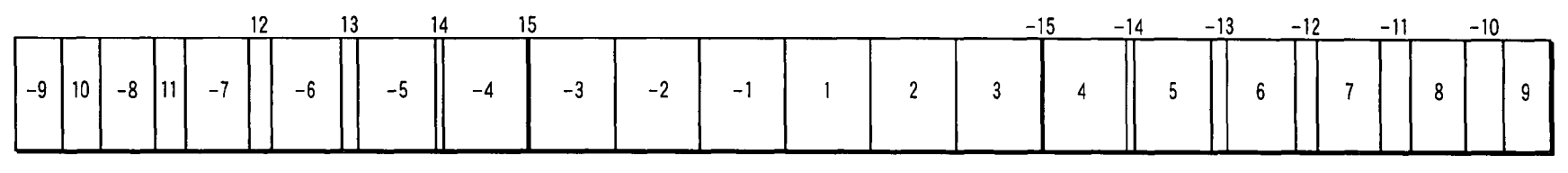

FIG. 16 shows an example in which the 18 connected images 2 shown in FIG. 12 are connected together along a straight line to obtain a single total connected image. The total connected image is constructed by connecting the connected images 2 containing the adjacent parallax directions so that they are arranged adjacent to one another in the horizontal direction. In this example, the two connected images containing the opposite terminals (#−9 and #9) of the 18 parallax directions are arranged at the opposite ends of the total connected image. This format corresponds to a suitable structure applied to a process substantially similar to that of multiview data in display apparatuses based on the multiview scheme.

Figure 17:
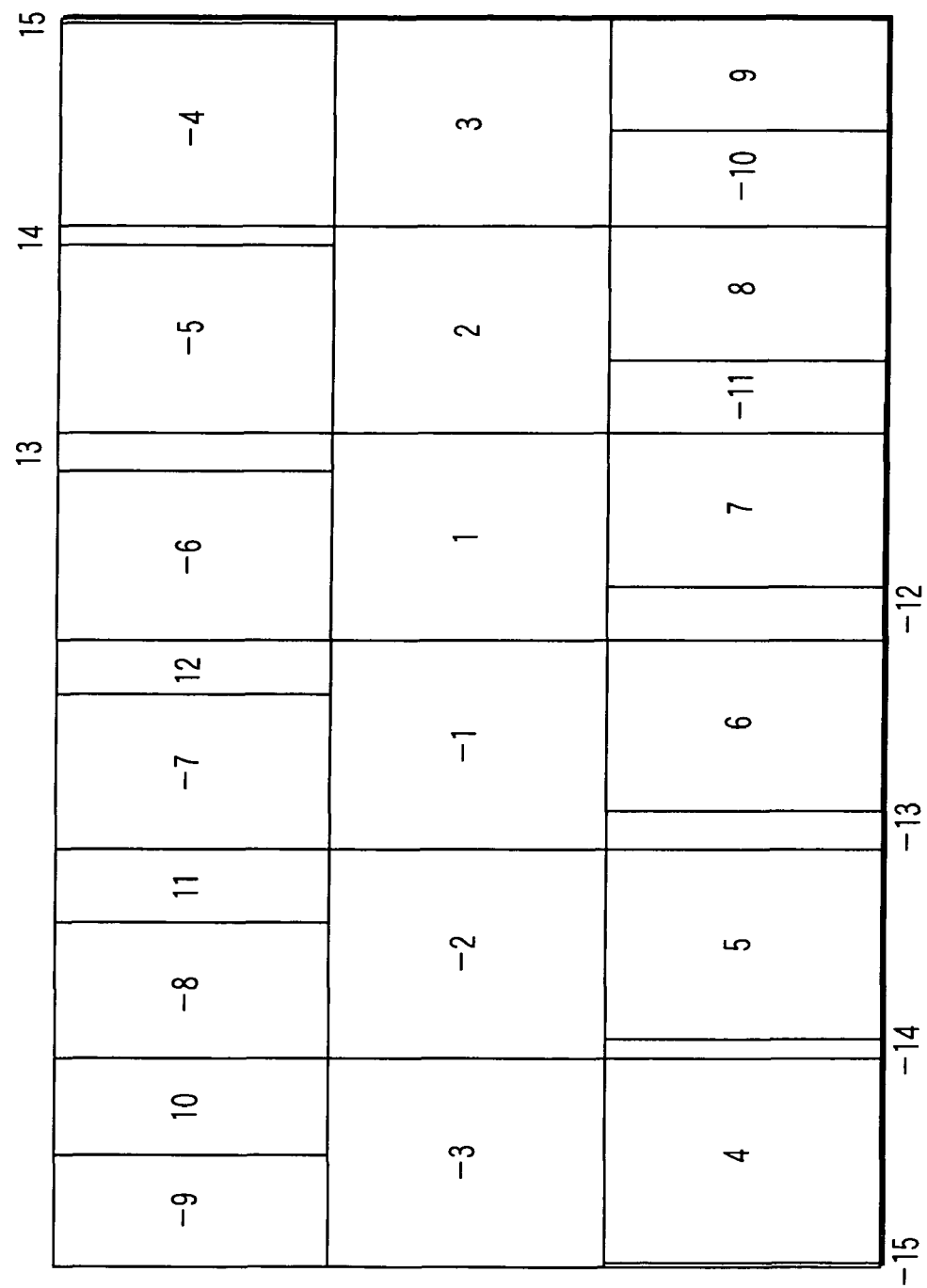
FIG. 17 is a plan view schematically showing the format of a total connected image in a method of recording a three-dimensional display image in accordance with another embodiment of the present invention.
Figure 38:
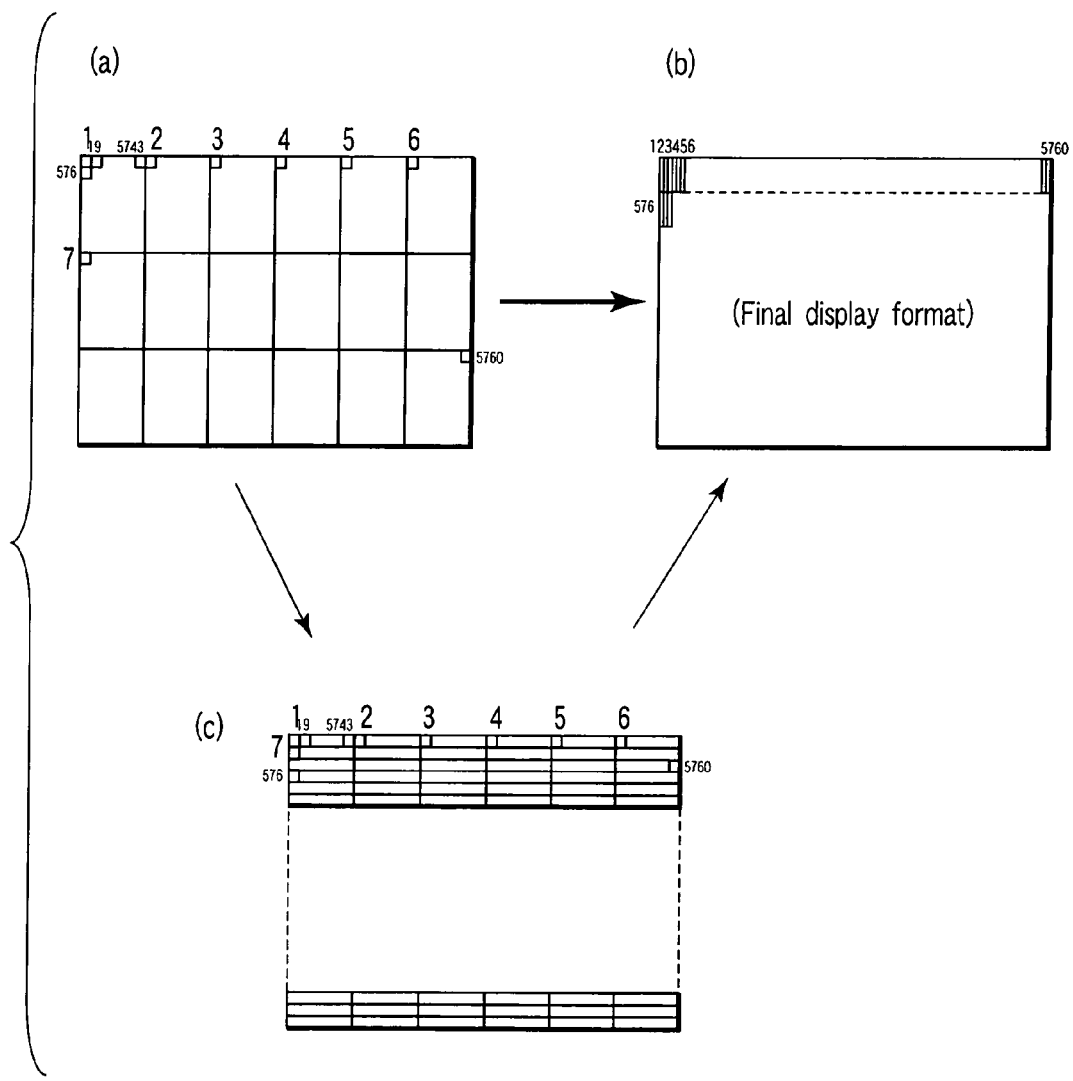
FIGS. 38($a$), 38($b$), and 38($c$) are a schematic diagram showing a total connected image and which is useful in describing a method of converting a total connected image into a parallax synthetic image in accordance with the embodiment of the present invention, a schematic diagram showing a parallax synthetic image into which the total connected image shown in FIG. 38($a$) is converted, and a schematic diagram showing an intermediate image format used to convert a total connected image into a parallax synthetic image in accordance with a variation of the embodiment of the present invention.
Figure 39B:
FIG. 39B is a diagram showing an example of a total connected image in accordance with the embodiment of the present invention.

As shown in FIG. 17, the 18 connected images 2 shown in FIG. 12 and having the same number of vertical pixels and the same number of horizontal pixels may be connected together by combining them in both horizontal and vertical directions and arranging them in tile form. The tile-like total connected image may be set to have the same number of vertical and horizontal pixels as those of a parallax synthetic image displayed on the display surface during three-dimensional display. Compressive recording can be achieved in a format in accordance with standards such as MPEG2 when the total connected image has the same numbers of vertical and horizontal pixels as those of the parallax synthetic image corresponding to the final display image. This enables inter-frame compression and intra-frame compression to be applied if the tile-like total connected image shown in FIG. 17 is used as a frame and a three-dimensionally displayable motion picture is to be reproduced using a plurality of frames. The laterally opposite ends of each parallax component image 426 correspond to the screen ends or viewing area ends for three-dimensional display. The connection between the parallax component images in each parallax component images corresponds to a viewing area end. The connection between connected images corresponds to a screen end. With irreversible compression, every given block size is encoded and the connection between connected images often coincides with a block boundary. Further, the connection between the parallax component images in each connected image often fails to coincide with a block boundary. However, at a viewing end (boundary with an adjacent lobe), a three-dimensional image itself is originally split and does not appear normal; it is not affected by degraded image quality. This prevents the degraded image quality of the connection from affecting the three-dimensional image in spite of the irreversible compression and decompression of the total connected image. The total connected image shown in FIG. 17 is converted into a parallax synthetic image as in the case of FIG. 37. However, this conversion corresponds to the mapping between images with the same number of vertical and horizontal pixels on a one-to-one correspondence, like the conversion of the total connected image shown in FIG. 38(*a*) into the parallax synthetic image shown in FIG. 38(*b*). In this conversion, pixels with the same row number may be extracted from each stage of the three-stage structure of the total connected image shown in FIG. 38(*a*), arranged in three rows, and sequentially output to obtain the image format shown in FIG. 38(*b*). This allows the conversion of the image format shown in FIG. 38(*c*) into the parallax synthetic image shown in FIG. 38(*b*) to be based on one-to-one mapping closed within three rows. Accordingly, some implementations may preferably use a procedure of converting the total connected image shown in FIG. 38(*a*) into the image format shown in FIG. 38(*c*) and then converting the image format shown in FIG. 38(*c*) into the parallax synthetic image shown in FIG. 38(b). FIG. 39B shows an example of an actual image in the format shown in FIG. 17.

Figure 18:
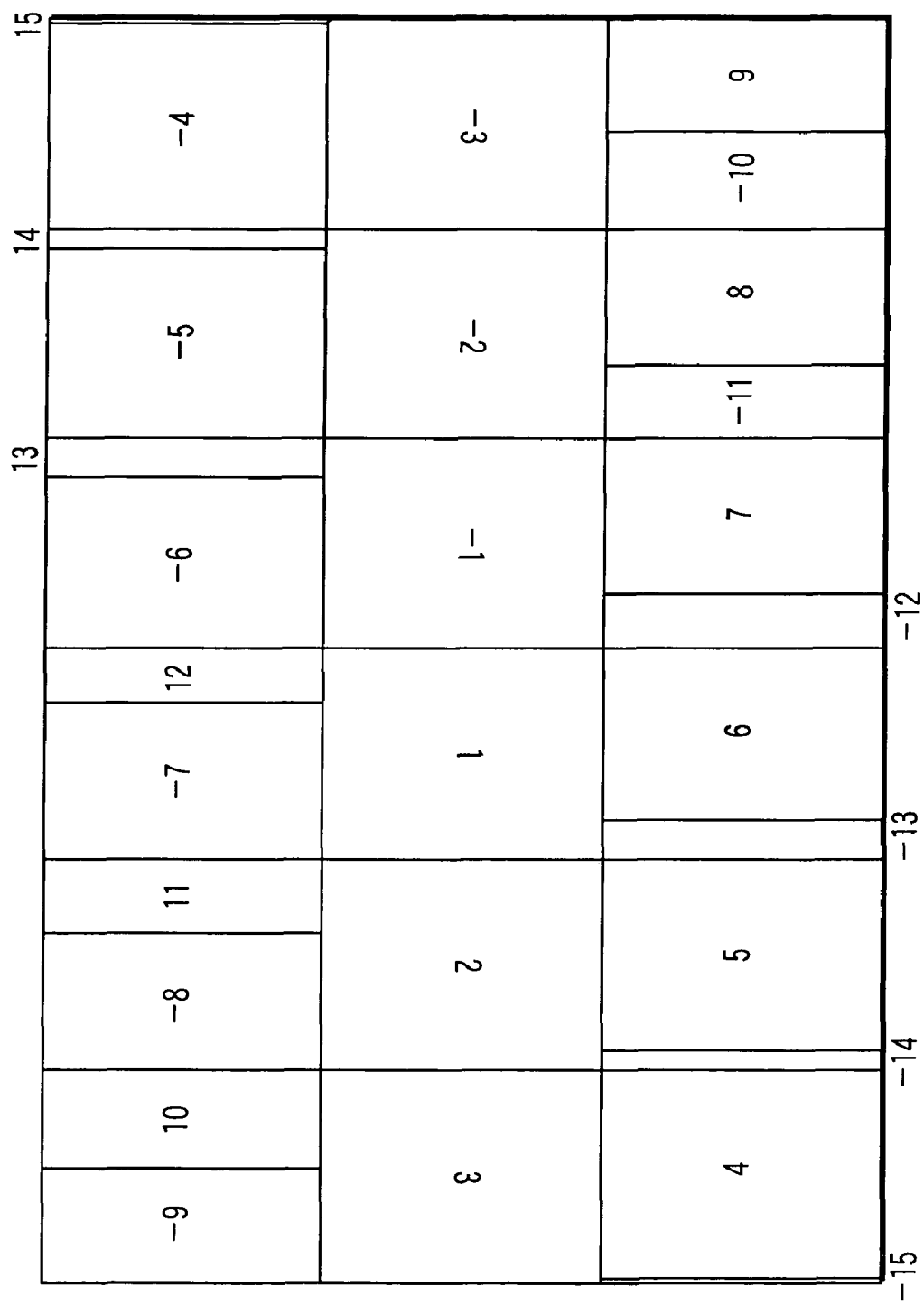
FIG. 18 is a plan view schematically showing the format of a total connected image in a method of recording a three-dimensional display image in accordance with yet another embodiment of the present invention.

As shown in FIG. 18, the total connected image may be constructed by connecting the connected images 2 so that the connected images in every other vertical stage are reversed. If the connected images 2 are connected together into multiple stages, relatively correlative screens are arranged in the vertical direction and connected together. This arrangement enables the application of inter-frame compression and intra-frame compression without degrading image quality as a result of irreversible compressive recording. However, the arrangement slightly complicates the process of conversion into a parallax synthetic image.

Figure 19:
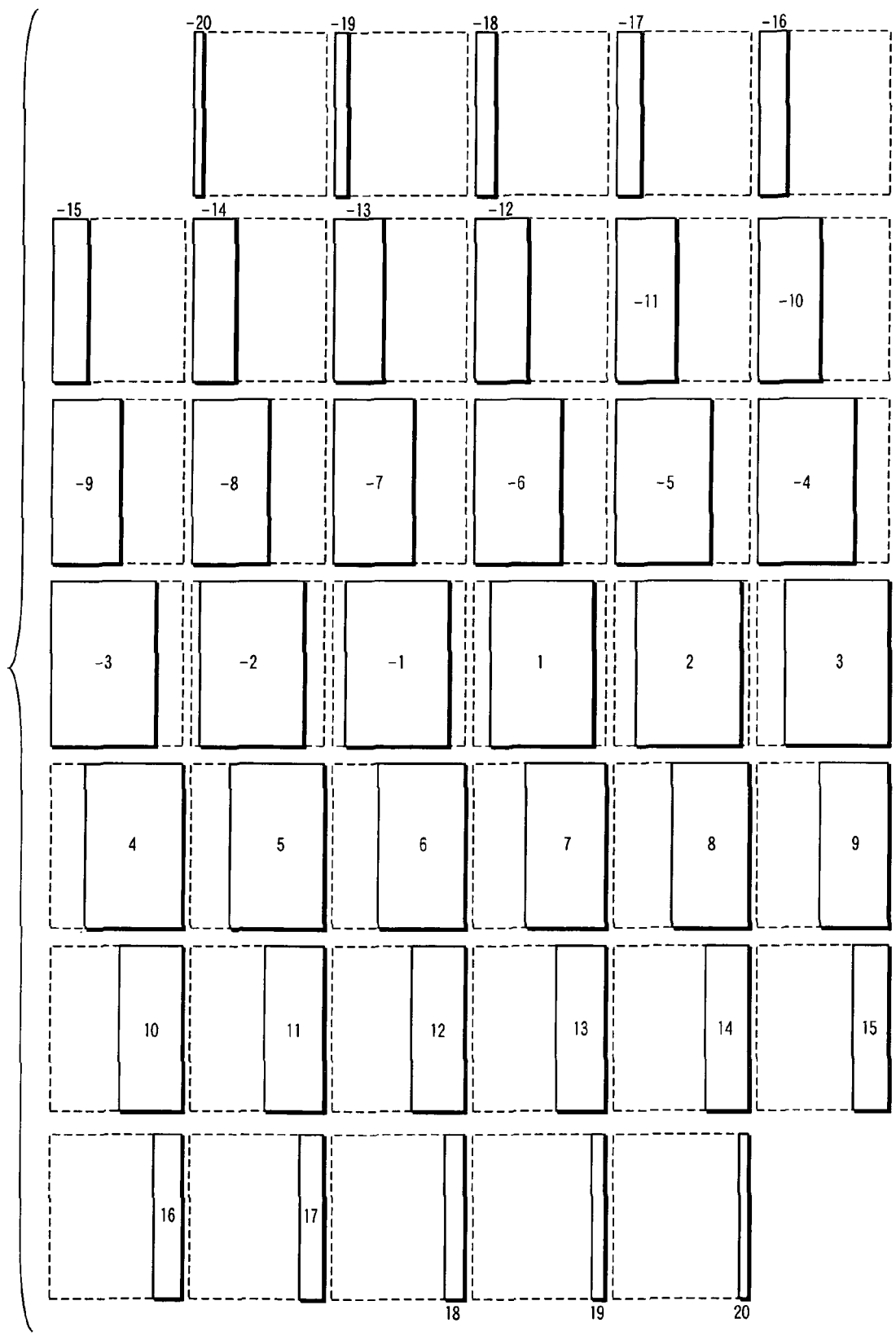
FIG. 19 is a diagram showing parallax component images in a method of recording a three-dimensional display image in accordance with still another embodiment of the present invention.

FIG. 19 shows an example of parallax component images 426 extracted from camera images if the number of parallax component images 426 is 18, as in the case of FIG. 13, and if the assumed viewing distance L is different from that for the parallax component images 426 shown in FIG. 13. As shown in FIG. 20, a total of 40 parallax directions are present. For example, the sum of the area widths (number of pixels) in the three parallax component images with parallax numbers −20, −2, and 17 is 14+251+55=320; the difference between these parallax numbers is 18. Similarly, the total widths in the 18 adjacent parallax directions are each 320. The table in FIG. 20 comprises the same items as those shown in FIG. 15. The description of the table in FIG. 20 is thus omitted.

Figure 21:
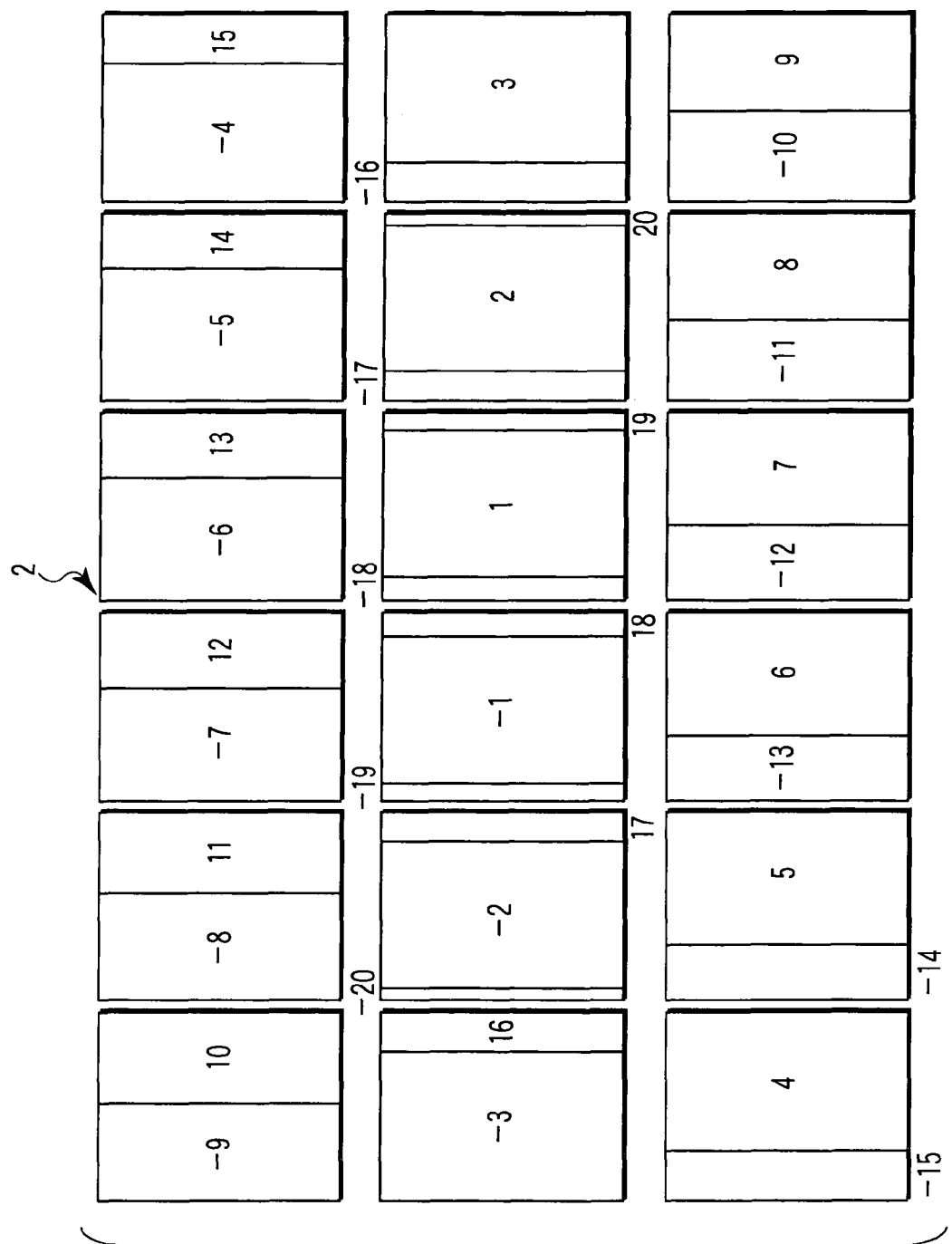
FIG. 21 is a plan view showing 18 connected images obtained by combining the parallax component images shown in FIG. 19 with the parallax component images shown in FIG. 20.

FIG. 21 shows 18 connected images obtained by combining the parallax component images 426 shown in FIGS. 19 and 20 together. None of the connected images 2 are composed of a single parallax component image 426 but each connected image 2 consists of two or three parallax component images 426. Four of the 18 connected images 2 are each composed of three parallax component images 426. The other connected images 2 are each composed of two parallax component images 426. Thus, with the same number of parallaxes (the configuration of the display apparatus remains unchanged), a change in assumed viewing distance increases or reduces the number of parallax directions and varies the range of number of pixels. However, the number of connected images remains 18. Therefore, a reading and decompressing process after compression such as the one shown in FIG. 37 is invariable.

Figure 22:
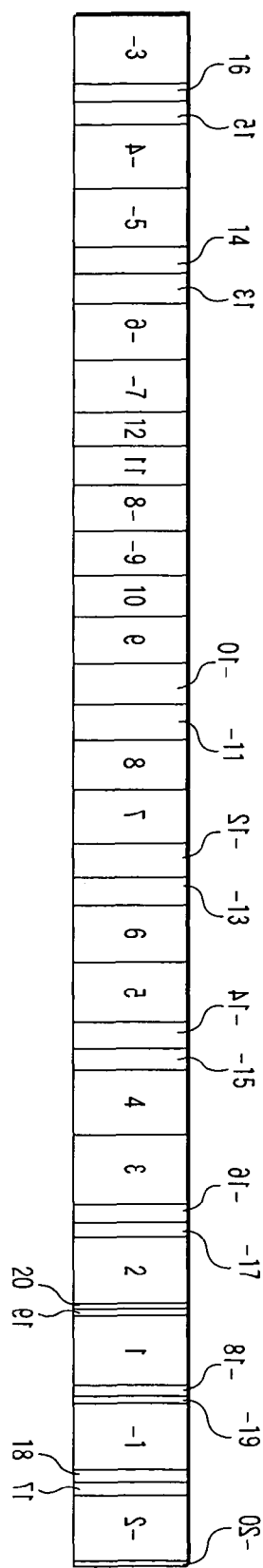
FIG. 22 is a plan view showing an example of a total connected image obtained by connecting the connected images shown in FIG. 21.

FIG. 22 shows an example of a total connected image obtained by laterally reversing every other connected image 2 shown in FIG. 21 and connecting the resulting connected images together so that the left or right ends of the adjacent parallax component images 426 are connected together. The connected images 2 with the turned-over parallax direction numbers correspond to the reversed connected images. The laterally opposite ends of each connected image 2 are the screen ends for three-dimensional display, and the adjacent cameras are highly correlative (adjacent columns in an element image). Thus, the reversed connection enables the application of inter-frame compression and intra-frame compression without degrading image quality as a result of irreversible compressive recording. However, this connection slightly complicates the process of conversion into a parallax synthetic image.

Figure 23:
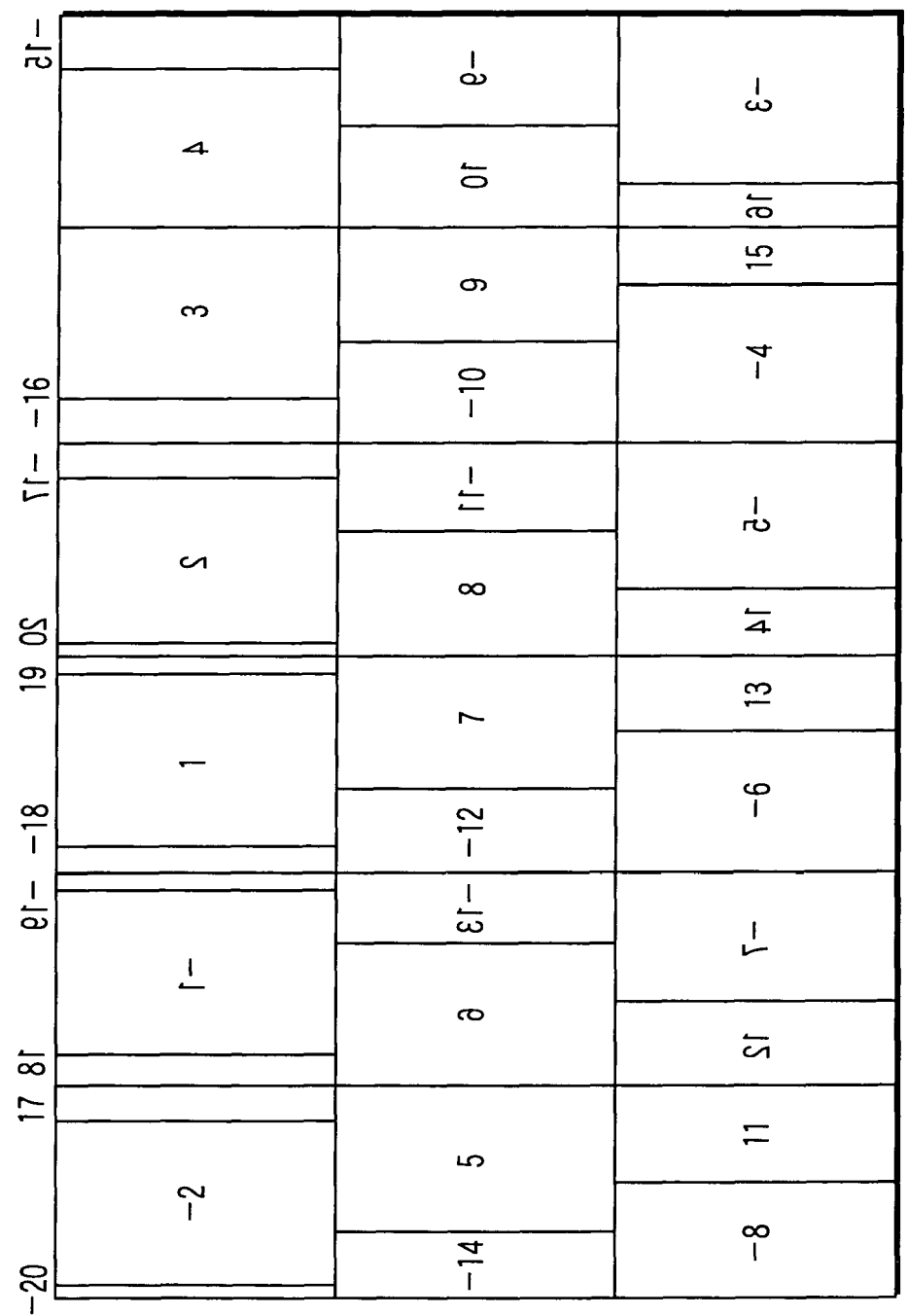
FIG. 23 is a plan view showing a variation of the total connected image shown in FIG. 22.
Figure 24:
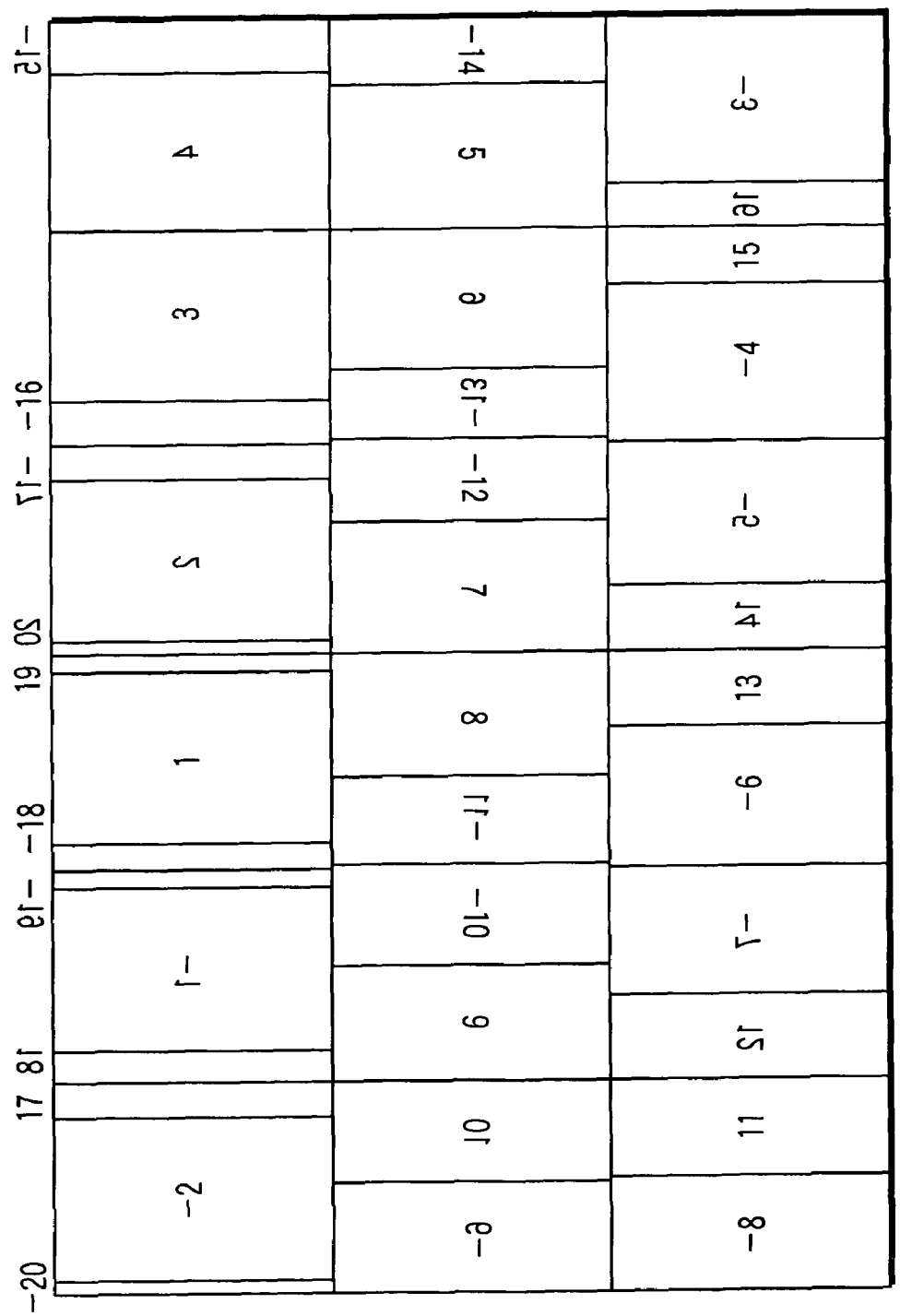
FIG. 24 is a plan view showing another variation of the total connected image shown in FIG. 22.

FIG. 23 shows an example in which the total connected image shown in FIG. 22 and obtained by laterally reversed connection is divided into three stages and arranged in tile form so as have the same number of vertical pixels and the same number of horizontal pixels as those of the parallax synthetic image. When the total connected image arranged in tile form has the same number of vertical pixels and the same number of horizontal pixels as those of the parallax synthetic image as shown in FIG. 23, compressive recording can be achieved in a format in accordance with standards such as MPEG2. For the arrangement in FIG. 23, the middle stage in the array shown in FIG. 22 may be vertically reversed as shown in FIG. 24.

Figure 25:
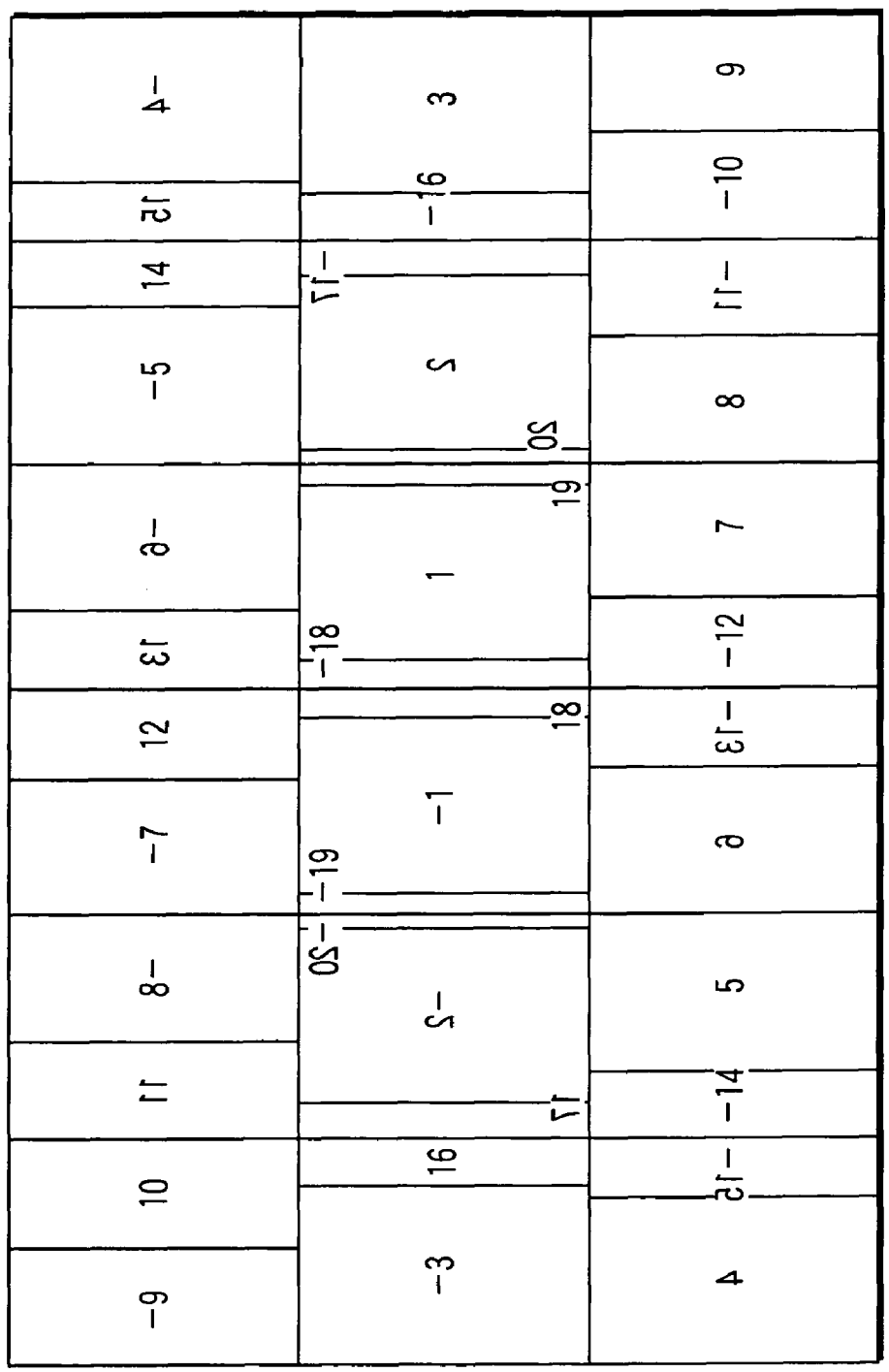
FIG. 25 is a plan view showing a further variation of the total connected image shown in FIG. 22.

FIG. 25 shows an example in which the array is changed so as to have an improved entire symmetry compared to that shown in FIG. 23. In FIG. 25, the total connected image is thus provided with symmetry so that all the connected images except the two central ones are reversed before being connected together.

Figure 26:
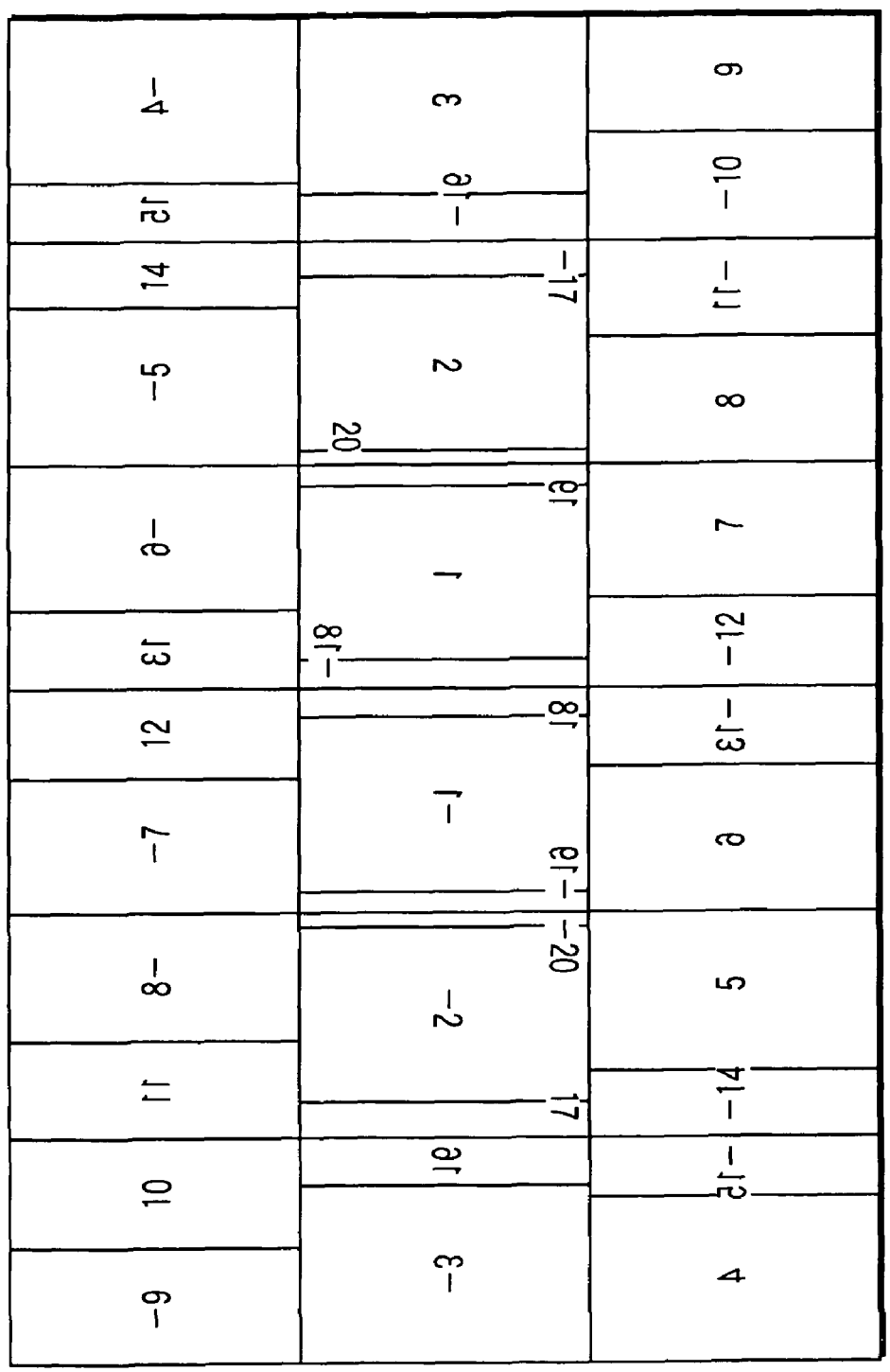
FIG. 26 is a plan view showing another variation of the total connected image shown in FIG. 22.
Figure 27:
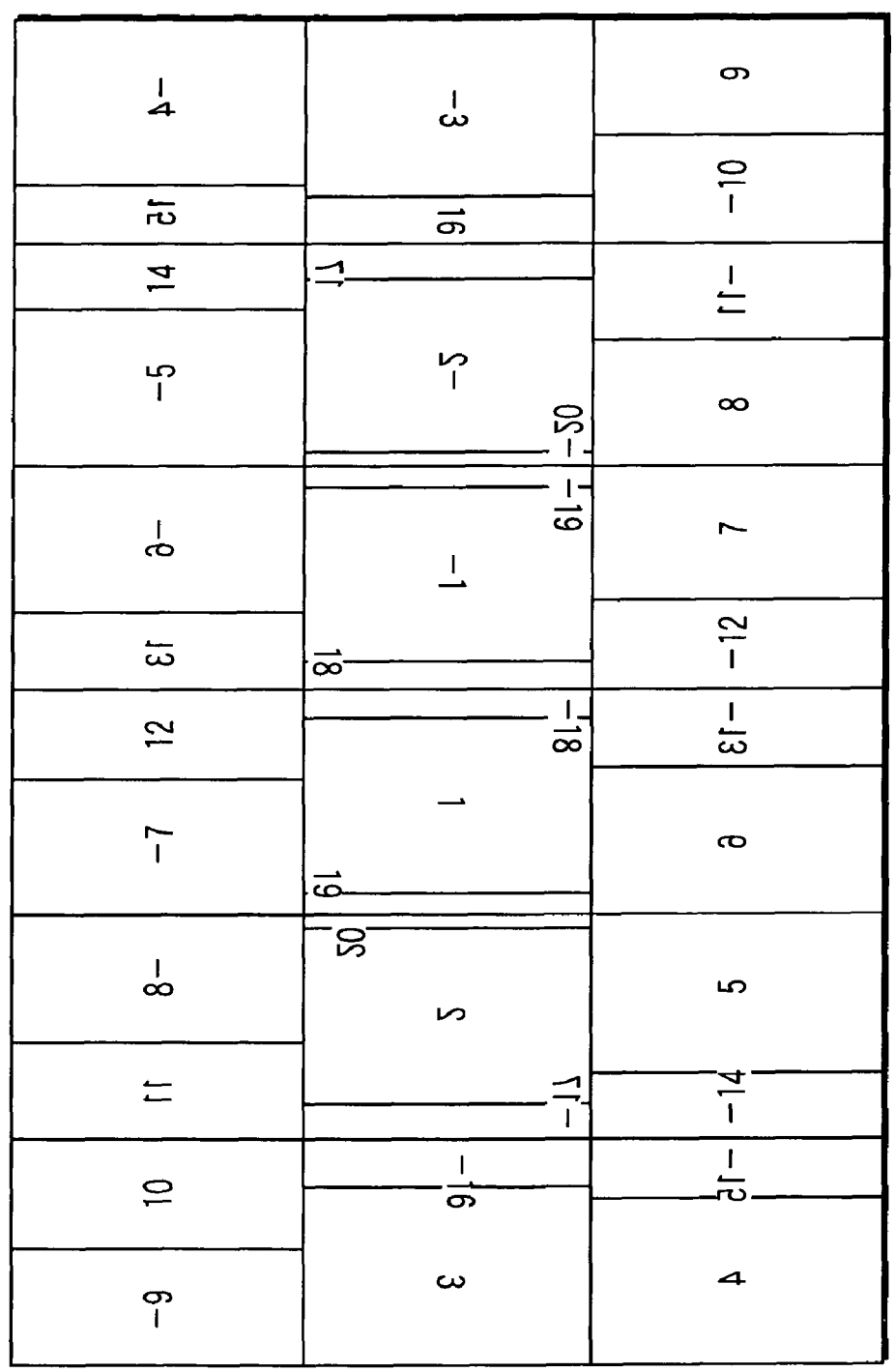
FIG. 27 is a plan view showing a further another variation of the total connected image shown in FIG. 22.

As shown in FIG. 26, the connected images in the middle stage of the total connected image shown in FIG. 25 may be vertically reversed. As shown in FIG. 27, the entire middle stage of the total connected image shown in FIG. 26 may further be laterally reversed.

As described above, if the number of parallaxes is a multiple of 3, the total connected image has the same numbers of vertical and horizontal pixels as those of the parallax synthetic image when having a three-stage structure. If the number of parallaxes is not a multiple of 3, a three-stage structure causes only two of the connected images to be split, which often only slightly degrades the quality of a three-dimensional image. The impact can further be reduced by selecting a parallax component image boundary to align well with the split position or selecting a parallax component image for the split position to correspond to an image from a camera number located outside the viewing area.

Figure 28:
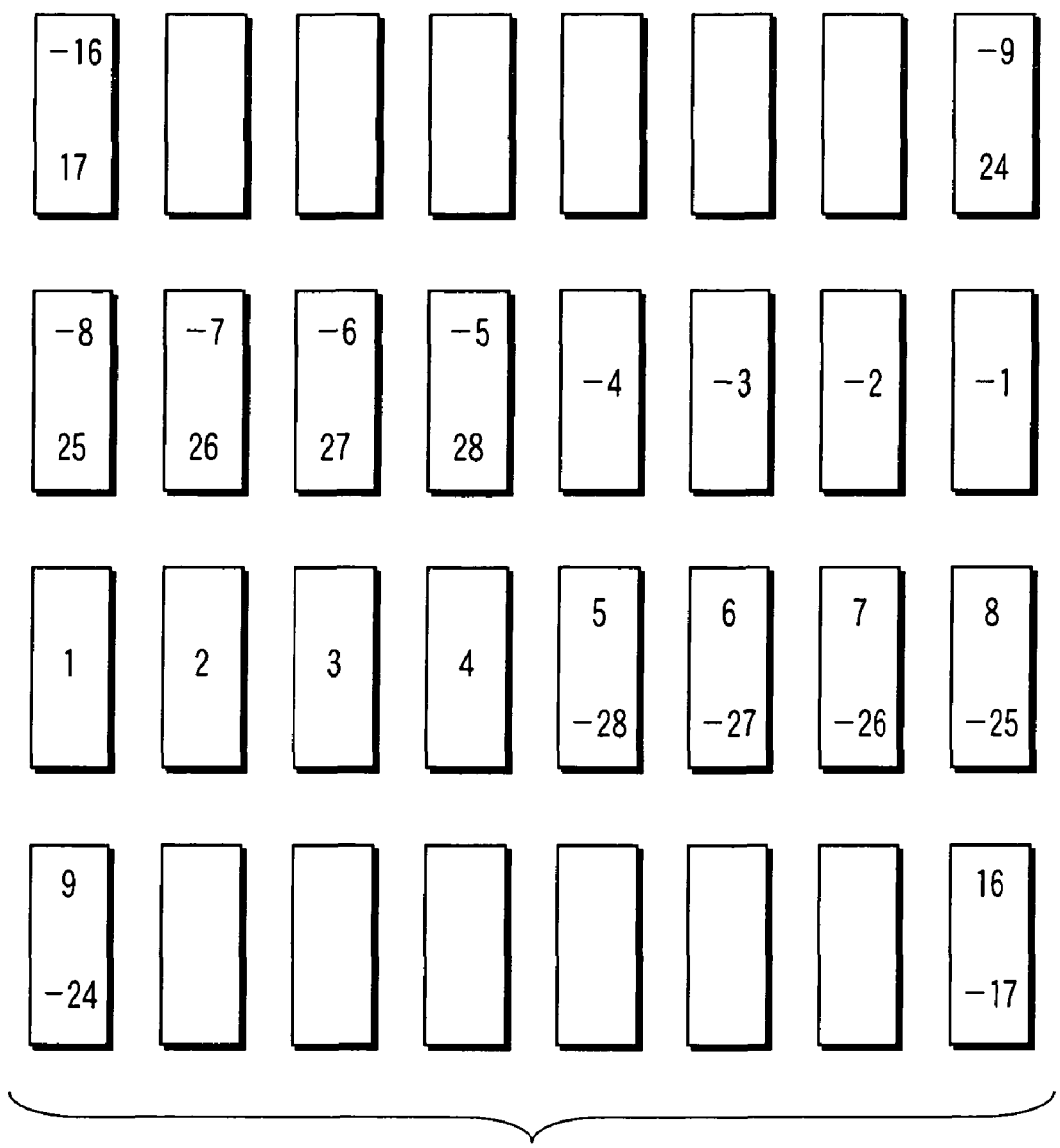
FIG. 28 is a plan view showing 32 connected images in a method of recording a three-dimensional display image in accordance with further another embodiment of the present invention.

FIG. 28 shows connected images 2 obtained if the number of parallaxes is 32 and if the 32 connected images 2 obtained by combining 56 parallax component images 426 together contain 300×800 pixels and if the parallax synthetic image contains 3,200×2,400 pixels (not subpixels). FIG. 28 shows only the parallax numbers of the parallax component images, with the boundaries (vertical lines) between the parallax component images omitted. FIG. 29 is an arrangement table indicating the connected images 2 shown in FIG. 28. The table shown in FIG. 29 has columns similar to those in the tables in FIGS. 16 and 20, and its description is thus omitted.

Figures 30, 31:
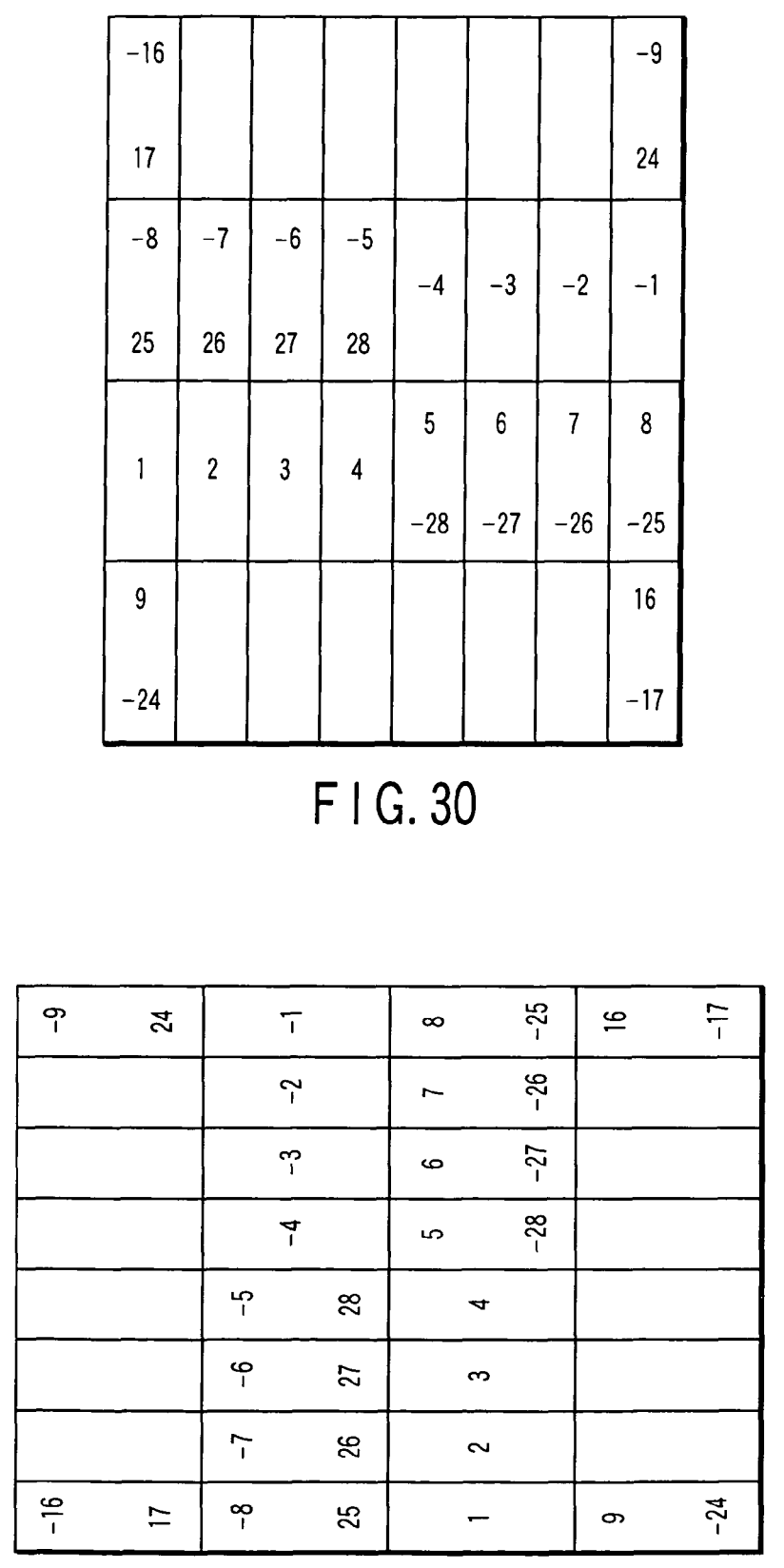

The connected images 2 shown in FIG. 28 are combined into a total connected image as shown in FIG. 30. This total connected image contains 2,400×3,200 pixels. It may further be rotated through 90° as shown in FIG. 31, and the total connected image has the same numbers of vertical and horizontal pixels as those of the parallax synthetic image.

Figure 33:
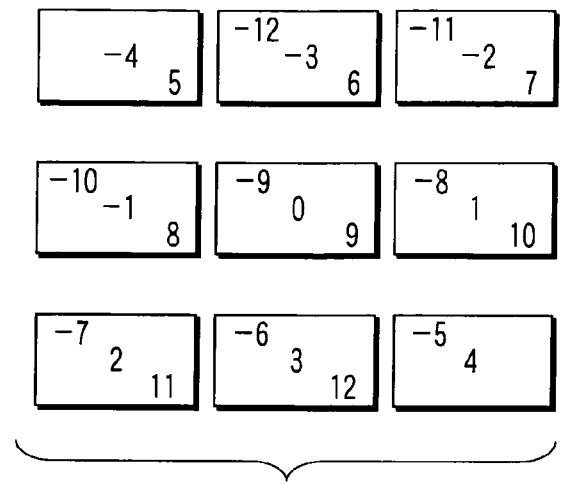
FIG. 33 is a plan view showing nine connected images obtained by combining the parallax component images shown in FIG. 32.

FIG. 32 is an arrangement table in accordance with another embodiment. The arrangement table corresponds to the case in which the number of parallaxes is 9 and in which the 9 connected images 2 obtained by combining 25 parallax component images 426 together contain 640×400 pixels and in which the parallax synthetic image contains 1,920×1,200 pixels (not subpixels). As is apparent from FIG. 32, an odd number of parallaxes allow the inclusion of a parallax number 0. The connected images shown in FIG. 32 are formed into the total connected image shown in FIG. 33. FIG. 33 shows only the parallax numbers of the parallax component images, with the boundaries (vertical lines) between the parallax component images omitted.

Figure 34:
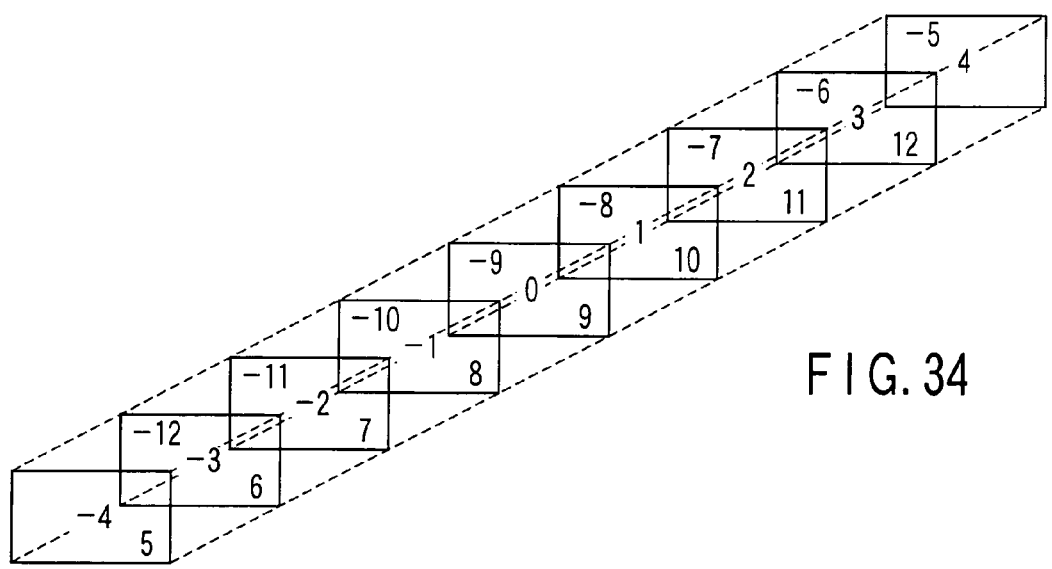
FIG. 34 is a perspective view showing a variation of a total connected image obtained by combining the connected images shown in FIG. 33.

The present invention is not limited to a planar arrangement of a total connected image such as the one shown in FIG. 34. The connected images may be connected into a rectangular parallelepiped-like ray space defined by a ray space method. A process such as compressive recording or interpolation can be executed on this rectangular parallelepiped-like virtual space.

Figure 35:
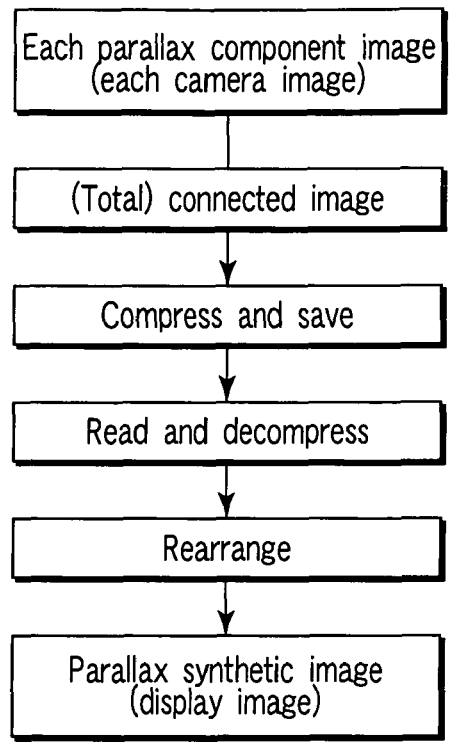
FIG. 35 is a diagram schematically showing a recording and reproducing method of irreversibly compressively recording, reading and decompressing, rearranging, and reproducing connected images or a total connected image created by the method of recording a three-dimensional display image in accordance with the above embodiment of the present invention.

With reference to FIG. 35, description will be given of a method of recording and reproducing a three-dimensional display image. FIG. 35 schematically shows a method of irreversibly compressively recording, reading and decompressing, rearranging, and reproducing connected images 2 or a total connected image created by the method of recording a three-dimensional display image in accordance with the above embodiment of the present invention. As described with reference to FIG. 14, images of the subject 421 to be displayed as a three-dimensional image are picked up at the camera positions (15 to 1 and –1 to –15). Camera images are thus acquired as shown by broken lines in FIG. 13. Parallax component images 421 such as those shown by solid lines in FIG. 13 are extracted from the camera images. Connected images are then formed by combining those of the parallax component images 421 which have parallax numbers the difference between which is equal to the number of parallaxes as shown in FIG. 12. The connected images are then combined and arranged into a total connected image as shown in FIGS. 16, 17, and 18. The total connected image is compressed by an irreversible encoding scheme with a high compression rate such as JPEG. If the three-dimensional image to be displayed is a motion picture, the total connected image and another temporally adjacent total connected image may be correlated with each other and similarly compressed using an irreversible encoding scheme with a high compression rate such as MPEG. The data on the compressed total connected image is stored in and saved in storage media or the storage section 312, shown in FIG. 3(a).

For reproduction, the total connected image compressed by the image processing section 314, shown in FIG. 3(a), is expanded and decompressed into a total connected image corresponding to an array of the connected images. Pixel column data on parallax component images 426 corresponding to the optical openings (apertures) is extracted from the connected images of the total connected image obtained. The pixel column data is then rearranged in a frame memory (not shown in the drawings) at predetermined pitches as shown in FIG. 37. Once the pixel column data on the parallax component images 462 is extracted from all the connected images and rearranged on the frame memory, an entire parallax synthetic image such as the one shown in FIG. 38(b) is completed. The parallax synthetic image is displayed on the display section 331 to direct a three-dimensional image toward the viewing area. For distributions (streaming) from a remote server, the storage section and the image processing section shown in FIG. 3(a) are remote from each other.

Figure 36A:
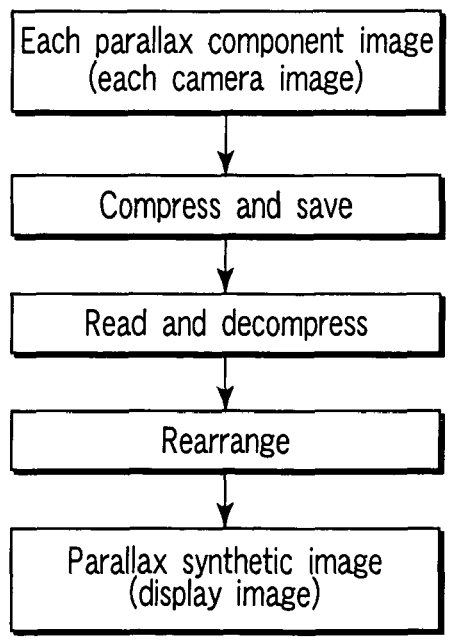
FIG. 36A is a flowchart schematically showing a recording and reproducing method of irreversibly compressively recording, reading and decompressing, rearranging, and reproducing connected images or a total connected image created by a method of recording a three-dimensional display image in accordance with a comparative example.

FIGS. 36A and 36B schematically show methods of irreversibly compressively recording, reading and decompressing, rearranging, and reproducing connected images 2 or total connected images created by methods of recording a three-dimensional display image in accordance with Comparative Examples 1 and 2, respectively. FIGS. 36A and 36B use the same reference numerals as those in FIG. 35 and their description is omitted.

The method shown in FIG. 36A directly compresses and saves parallax component images. The method shown in FIG. 36B forms parallax component images into a parallax synthetic image and then compresses and saves the parallax synthetic image. For reading and decompression, the compressed parallax synthetic image is decompressed and displayed directly on the display section 331.

As is apparent from a comparison of FIG. 35 with FIGS. 36A and 36B, the method shown in FIG. 35 carries out conversion into connected images 2 having the same numbers of vertical and horizontal pixels before compression. This avoids the adverse effect of an increase or decrease in the number of parallax directions or a variation in the range of number of pixels resulting from a change in assumed viewing distance. The degradation of image quality is thus minimized. In particular, the compression rate can further be improved by adopting such arrangements and combinations as correlate the connected images 2 with one another.

The method shown in FIG. 36A individually compresses parallax component images 426. This method poses no problems when applied to the multiview scheme. However, this method is not suitable for the parallel-ray one-dimensional IP scheme because of a large number of parallax directions, different numbers of horizontal pixels, and the adverse effect of an increase or decrease in the number of parallax directions or a variation in the range of number of pixels resulting from a change in assumed viewing distance. The method shown in FIG. 36B carries out compression by the format of a parallax synthetic image. However, with this method, irreversible compression much degrades image quality, whereas reversible compression reduces the compression rate, regardless of the use of the multiview or parallel-ray one-dimensional IP scheme.

As described above, the present invention enables efficient recording and reproduction on the basis of the parallel-ray one-dimensional IP scheme, while minimizing the degradation of image quality and accomplishing a high compression rate. Like general MPEG data or the like, the three-dimensional data structure and recording method in accordance with the present invention are applicable not only to recording on recording media but also distributions utilizing wired or wireless communication means, that is, streaming.

The methods of recording and reproducing a three-dimensional display image in accordance with the present invention enable efficient recording and reproduction on the basis of the parallel-ray one-dimensional IP scheme, while minimizing the degradation of image quality and accomplishing a high compression rate.

The present invention is not limited to the above embodiments proper. In implementation, the embodiments may be varied without departing from the spirit of the present invention.

Various inventions can be formed by appropriately combining a plurality of the components disclosed in the embodiments. For example, some of the components shown in the embodiments may be deleted. Components in accordance with different embodiments may also be appropriately combined together.

The present invention provides methods of recording and reproducing a three-dimensional display image which method enable efficient recording and reproduction on the basis of the parallel-ray one-dimensional IP scheme, while minimizing the degradation of image quality and accomplishing a high compression rate.

What is claimed is:

1. A structure of three-dimensional image data for a three-dimensional image display apparatus, said the apparatus displaying a three-dimensional image in a viewing area by providing parallaxes in a horizontal direction and not in a vertical direction, and comprising:

a display section having a display surface on which pixels are arranged in the horizontal direction at a first horizontal pitch to display a parallax synthetic image for three-dimensional display; and a parallax barrier placed opposite the display surface and having linear optical openings arranged in the horizontal direction at a second horizontal pitch that is n (an integer) times as large as the first horizontal pitch, the parallax barrier parallelizing and directing rays from every n pixels arranged on the display surface along the horizontal direction, toward the viewing area;

said structure of three-dimensional image data comprising data on n or more parallax component images in each of which pixel columns allowing the pixels to generate parallel rays in the same parallax direction in the viewing area are accumulated, the parallax component images having different numbers of horizontal pixels, and every n connected images each obtained by combining one or more parallax component images corresponding to n-th adjacent parallax directions being converted into a parallax synthetic image, the connected images having substantially the same number of vertical pixels and substantially the same number of horizontal pixels.

2. A method of recording three-dimensional image data for a three-dimensional image display apparatus, said the apparatus displaying a three-dimensional image in a viewing area by providing parallaxes in a horizontal direction and not in a vertical direction, and comprising:

a display section having a display surface on which pixels are arranged in the horizontal direction at a first horizontal pitch to display a parallax synthetic image for three-dimensional display, and a parallax barrier placed opposite the display surface and having linear optical openings arranged in the horizontal direction at a second horizontal pitch that is n (an integer) times as large as the first horizontal pitch, the parallax barrier parallelizing and directing rays from every n pixels arranged on the display surface along the horizontal direction, toward the viewing area:

said method comprising:

providing data on n or more parallax component images in each of which pixel columns allowing the pixels to generate parallel rays in the same parallax direction in the viewing area are accumulated, the parallax component images having different numbers of horizontal pixels; and recording the data by converting every n connected images each obtained by combining one or more parallax component images corresponding to n-th adjacent parallax directions, into a parallax synthetic image, the connected images having substantially the same number of vertical pixels and substantially the same number of horizontal pixels.

3. The method of recording a three-dimensional image data according to claim 2, wherein perspective projection corresponding to the viewing distance is carried out in the vertical direction of each of the parallax component images, and orthographic projection is carried out in the horizontal direction of the parallax component image.

4. The method of recording a three-dimensional image data according to claim 2, wherein perspective projection is carried out in both the vertical and horizontal directions of each of the parallax component images.

5. The method of recording a three-dimensional image data according to claim 2, wherein one total connected image obtained by further connecting the n connected images is recorded.

6. The method of recording a three-dimensional image data according to claim 5, wherein the total connected image is constructed by connecting connected images containing adjacent parallax directions so that the connected images lie adjacent to one another in the horizontal direction.

7. The method of recording a three-dimensional image data according to claim 6, wherein the total connected image is constructed by connecting connected images containing adjacent parallax directions so that the connected images lie adjacent to one another in the horizontal direction, and two connected images containing respective parallax directions located at opposite ends of n parallax directions close to a front of the display surface are arranged at opposite ends of the total connected image.

8. The method of recording a three-dimensional image data according to claim 5, wherein the total connected image is constructed by connecting connected images so that left or right ends of adjacent parallax component images lie adjacent to each other.

9. The method of recording a three-dimensional image data according to claim 5, wherein the total connected image is constructed by connecting the connected images in tile form in the horizontal and vertical directions.

10. The method of recording a three-dimensional image data according to claim 9, wherein the total connected image is constructed by connecting the connected images so that the connected images in every other vertical stage are reversed.

11. The method of recording a three-dimensional image data according to claim 9, wherein the total connected image has the same numbers of vertical and horizontal pixels as those of a parallax synthetic image displayed on the display surface during three-dimensional display.

12. The method of recording a three-dimensional image data according to claim 5, wherein the total connected image is constructed as a rectangular parallelepiped-like ray space defined by a ray space method.

13. The method of recording a three-dimensional image data according to claim 2, wherein the connected images are recorded by irreversible compression.

14. The method of recording a three-dimensional image data according to claim 3, wherein the connected images are recorded by irreversible compression.

15. The method of recording a three-dimensional image data according to claim 4, wherein the connected images are recorded by irreversible compression.

16. The method of recording a three-dimensional image data according to claim 5, wherein the total connected image is recorded by irreversible compression.

17. The method of recording a three-dimensional image data according to claim 9, wherein the total connected image is recorded by irreversible compression.

18. The method of recording a three-dimensional image data according to claim 11, wherein the total connected image is recorded by irreversible compression.

19. A method of displaying and reproducing a three-dimensional image, the method allowing a three-dimensional image display apparatus to display a three-dimensional image in a viewing area by providing parallaxes in a horizontal direction and not in a vertical direction, the three-dimensional image display apparatus comprising a display section having a display surface on which pixels are arranged in a horizontal direction at a first horizontal pitch to display a parallax synthetic image for three-dimensional display, and a parallax barrier placed opposite the display surface and having linear optical openings arranged in the horizontal direction at a second horizontal pitch that is n (an integer) times as large as the first horizontal pitch, the parallax barrier parallelizing and directing rays from every n pixels arranged on the display surface along the horizontal direction, toward a viewing area, the method comprising:

providing data on n or more parallax component images in each of which pixel columns allowing the pixels to generate parallel rays in the same parallax direction in the viewing area are accumulated, the parallax component images having different numbers of horizontal pixels;

recording n connected images each obtained by combining one or more parallax component images corresponding to n-th adjacent parallax directions, the connected images having substantially the same number of vertical pixels and substantially the same number of horizontal pixels; and converting the n connected images into a parallax synthetic image and displaying the parallax synthetic image on the display section.

20. A method of displaying and reproducing a three-dimensional image, the method allowing a three-dimensional image display apparatus to display a three-dimensional image in a viewing area by providing parallaxes in a horizontal direction and not in a vertical direction, the three-dimensional image display apparatus comprising a display section having a display surface on which pixels are arranged in a horizontal direction at a first horizontal pitch to display a parallax synthetic image for three-dimensional display, and a parallax barrier placed opposite the display surface and having linear optical openings arranged in the horizontal direction at a second horizontal pitch that is n (an integer) times as large as the first horizontal pitch, the parallax barrier parallelizing and directing rays from every n pixels arranged on the display surface along the horizontal direction, toward a viewing area, the method comprising:

providing data on n or more parallax component images in each of which pixel columns allowing the pixels to generate parallel rays in the same parallax direction in the viewing area are accumulated, the parallax component images having different numbers of horizontal pixels;

recording one total connected image obtained by connecting a group of images including n connected images each obtained by combining one or more parallax component images corresponding to n-th adjacent parallax directions, the connected images having substantially the same number of vertical pixels and substantially the same number of horizontal pixels; and converting the one total connected image into a parallax synthetic image and displaying the parallax synthetic image on the display section.

* * * * *